United States Patent [19]

Johnson-Williams et al.

[11] Patent Number: 5,523,886

[45] Date of Patent: Jun. 4, 1996

[54] STEREOSCOPIC/MONOSCOPIC VIDEO DISPLAY SYSTEM

[75] Inventors: Mark B. Johnson-Williams, Half Moon Bay; Teck Yong, Mountain View, both of Calif.

[73] Assignee: Sega of America, Inc., Redwood City, Calif.

[21] Appl. No.: 177,664

[22] Filed: Jan. 4, 1994

[51] Int. Cl.[6] .......................... G02B 27/22; H04N 13/04; H04N 15/00
[52] U.S. Cl. .......................... 359/464; 359/466; 348/51; 348/52
[58] Field of Search .................................. 359/462, 464, 359/466, 467, 465; 345/204, 213; 348/51, 52, 55

[56] References Cited

U.S. PATENT DOCUMENTS

| | | | |
|---|---|---|---|
| 4,510,525 | 4/1985 | Kuperman et al. | 348/52 |
| 4,651,201 | 3/1987 | Schoolman | 348/45 |
| 4,754,327 | 6/1988 | Lippert | 359/470 |
| 4,772,944 | 9/1988 | Yoshimura | 348/56 |
| 4,932,765 | 6/1990 | Carner | 359/504 |
| 4,954,890 | 9/1990 | Park | 348/58 |
| 4,979,033 | 12/1990 | Stephens | 348/56 |
| 5,084,763 | 12/1992 | Naradate et al. | 359/88 |
| 5,281,957 | 1/1994 | Schoolman | 359/466 |

*Primary Examiner*—Paul M. Dzierzynski
*Assistant Examiner*—Audrey Chang
*Attorney, Agent, or Firm*—Skjerven, Morrill, MacPherson, Franklin & Friel; Norman R. Klivans; David T. Millers

[57] ABSTRACT

A stereoscopic video display device includes a left and a right video display for viewing by respectively the left and right eye of a viewer, a video driver circuit which alternates between driving the left video display and driving the right video display, and a view control circuit for providing a left-right signal which indicates which video display is currently displaying the video signal. A video signal source, such as a computer or a video game console, receives the left-right signal and provides a standard video signal. The stereoscopic display is usable with a source that provides a video signal that represents a left or right view according to the left-right signal, or with a source that ignores the left-right signal and provides a monoscopic video signal. The stereoscopic display is operable in both a stereo and a mono mode so that a user can select either monoscopic or stereoscopic video when the source is capable of providing stereoscopic views.

20 Claims, 23 Drawing Sheets

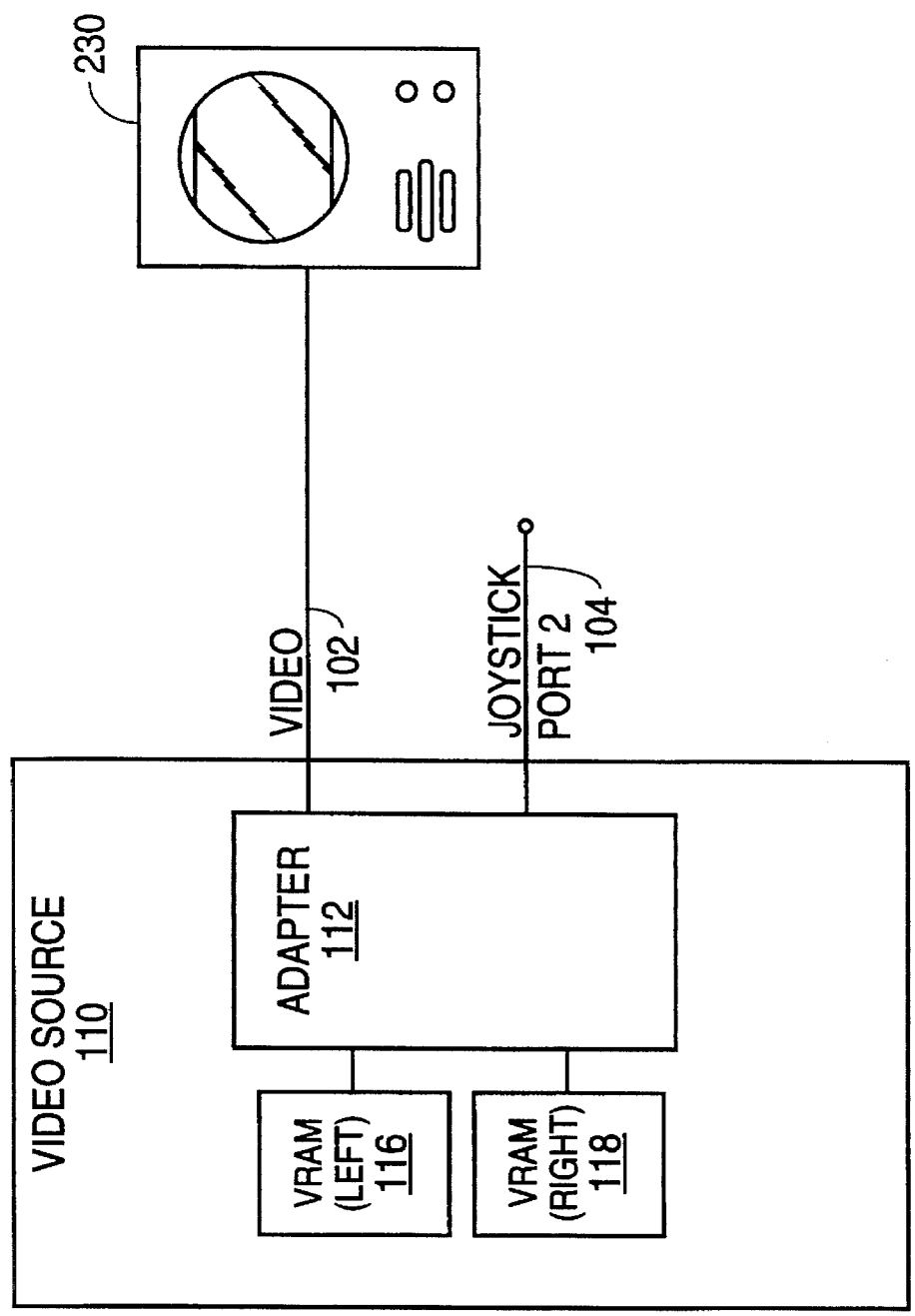

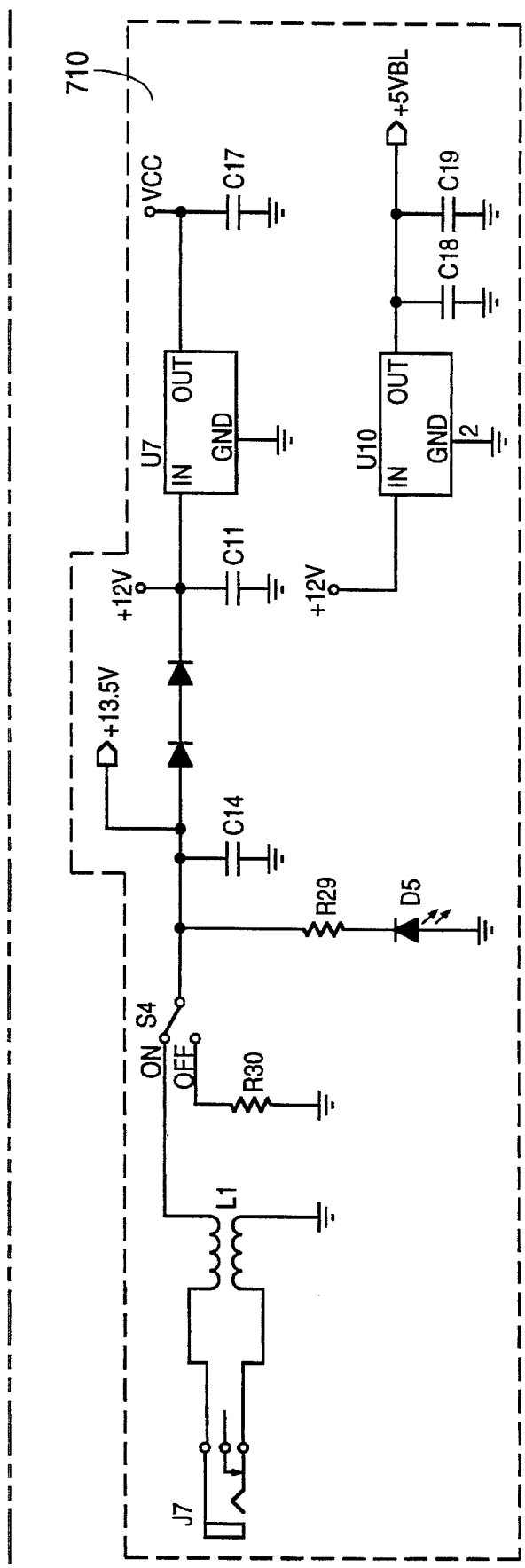
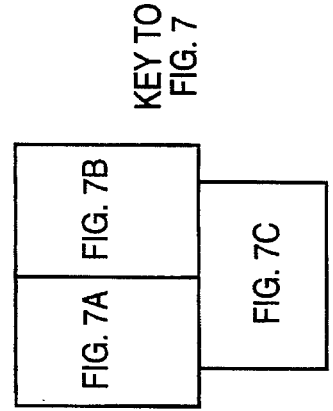
FIG. 7C
KEY TO FIG. 7
| FIG. 7A | FIG. 7B |
| FIG. 7C | |

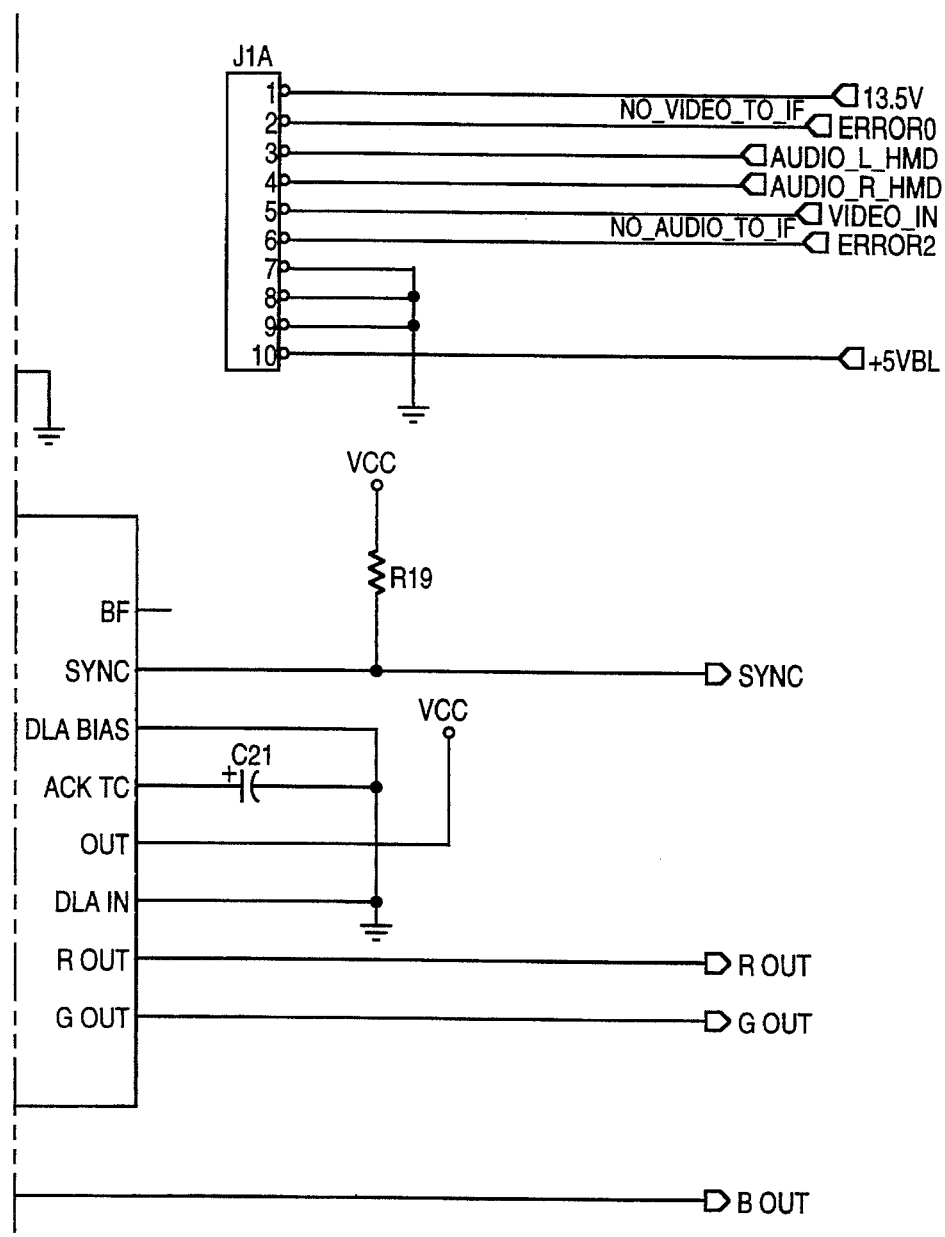
FIG. 8B
KEY TO FIG. 8
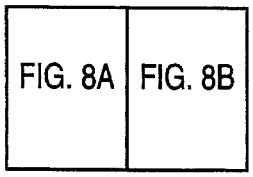

KEY TO FIG. 9

| FIG. 9A | FIG. 9B |

| KEY TO FIG. 11 | |
|---|---|
| FIG. 11A | FIG. 11B |

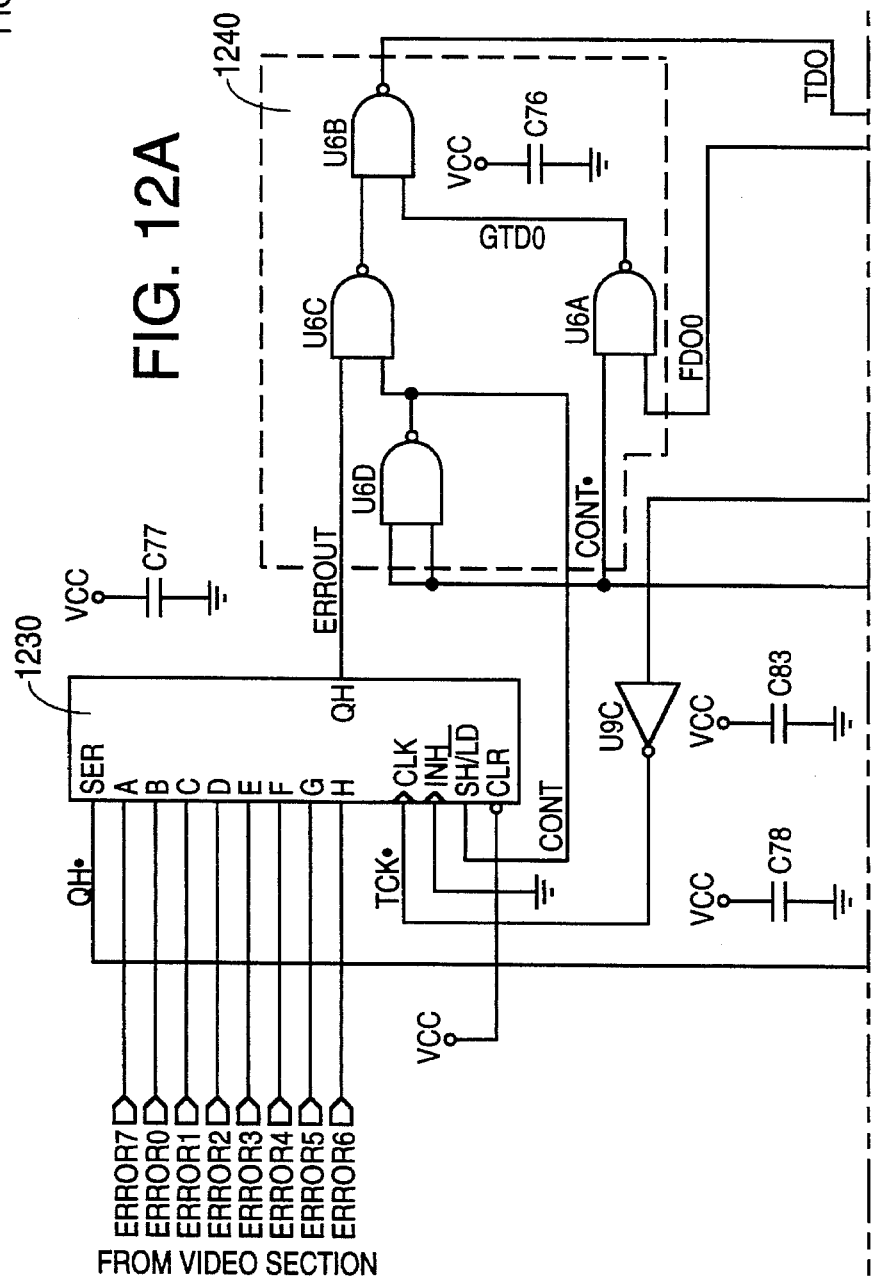

FIG. 13B
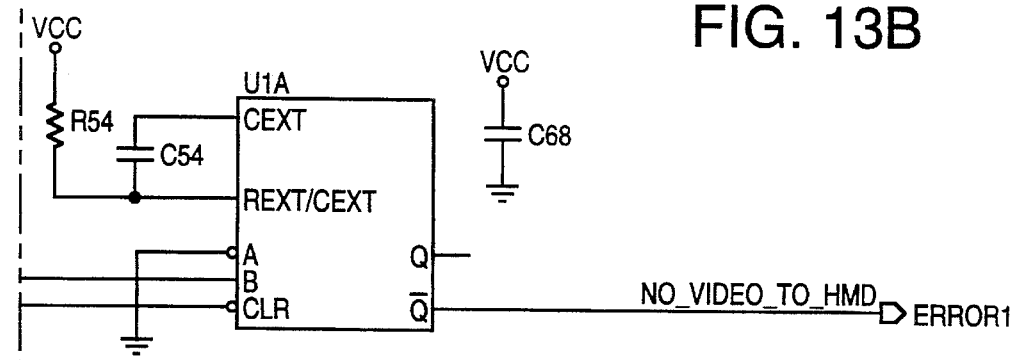
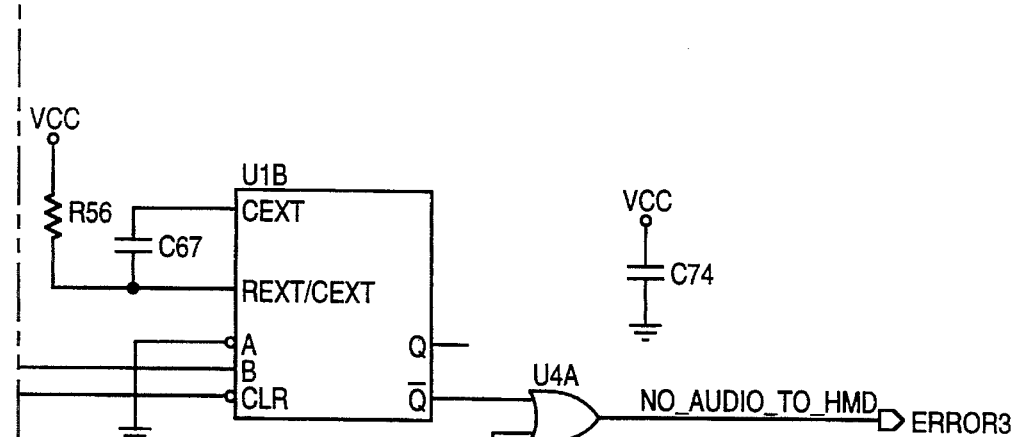
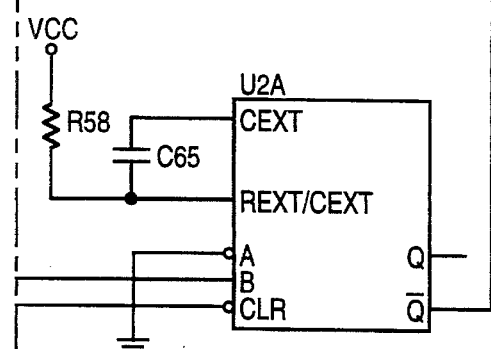
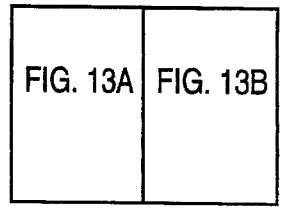

STEREOSCOPIC/MONOSCOPIC VIDEO DISPLAY SYSTEM

CROSS-REFERENCES TO RELATED APPLICATION

This application is related to, and incorporates by reference, commonly owned U.S. patent application Ser. No. 08/177,815 entitled "Communication Protocol," attorney docket No. M-2574, filed on the same date as the present application.

BACKGROUND OF THE INVENTION

1. Field of the Invention

This invention relates to apparatuses and methods for selectably providing either monoscopic or stereoscopic video display in a system which may include a variety of video display devices.

2. Description of Related Art

Depth perception is well known to be primarily a result of the left and right eyes seeing objects from different view points. The brain combines a left eye view and a right eye view, through an instinctive use of triangulation, to perceive three dimensions. Most common video displays, such as televisions, are unable to provide images that appear three dimensional because the displays provide only a single view and triangulation which penetrates the view is not possible. Stereoscopic video displays attempt to provide a different view to each eye. If the two different views are sufficiently close to left and right eye views of an actual object, the brain combines the two views and perceives a three dimensional image.

One stereoscopic display method uses a single display and special spectacles which change an image on the display differently for each eye. Common examples include spectacles with different color filters, different polarization filters, or shutters which alternately blank left and right eyes. Generally, the associated single screen images are blurry when viewed without the special spectacles.

Other stereoscopic display methods employ separate left and right displays, for viewing by left and right eyes of a viewer. Such methods typically require special video signals and special image processing circuits, and cannot be used with monoscopic displays.

Most existing systems and video games are monoscopic only and not designed to operate with stereoscopic displays. This lack of stereoscopic images limits the attractiveness of such prior art games, especially for "virtual reality" applications.

SUMMARY OF THE INVENTION

In accordance with the present invention, the capabilities of video game systems can be expanded to optionally include stereoscopic images and displays. Such systems can be implemented on existing game consoles that were not designed for producing stereoscopic images, and are compatible with existing monoscopic displays such as televisions and video monitors so that games that work with stereoscopic displays also work on conventional televisions. Further, for people who have difficulty viewing stereoscopic video or people who prefer monoscopic video, the stereoscopic displays are operable in monoscopic mode.

In accordance with the present invention, a stereoscopic video display device includes a left and a right video display for viewing by respectively the left and the right eye of a viewer, a driver circuit which alternates between driving the left and the right video display, and a view control circuit for providing a left-right signal which indicates which video display is currently displaying the video signal. Typically, the left and right video displays are small (e.g. LCD) displays mounted on a helmet and having an associated optical system for viewing the left display with the left eye and the right display with the right eye.

Video displays in accordance with the invention may be used with a video signal source, typically a computer or a video game console, which receives the left-right signal from the display and provides a video signal representing left or right view depending on the left-right signal value. Many known sources of video signals which have at least one available input lead can be programmed to generate stereoscopic video and be used with the stereoscopic video displays, even if the source is not specifically designed for stereoscopic video. The stereoscopic display is also usable with a source that ignores the left-right signal and provides a video signal that represents a monoscopic view.

In one embodiment, the driver circuit in the stereoscopic display is operable in both a stereo mode and a mono mode. In stereo mode, the driver circuit alternately drives the left video display and then the right video display, and the left-right signal requests a left or right view according to the active display. In mono mode, the video signal is simultaneously routed to both the left and right displays so that left and right eyes of a viewer see the same images, and the left-right signal always requests the same view.

Another embodiment in accordance with the invention is a stereoscopic video system that includes a display as described above along with a source of video signals capable of interpreting the left-right signal and acting accordingly.

In still another embodiment, an interface box is provided as part of the stereoscopic display and provides a convenient location for circuitry. With the interface box, the head mounted portion of the display can be made lighter and retrofitting of circuitry in the video signal source is avoided.

BRIEF DESCRIPTION OF THE DRAWINGS

FIG. 2 shows a block diagram of a video signals source in accordance with the invention connected to a monoscopic video display.

Similar or identical elements in different figures have the same reference symbols.

DETAILED DESCRIPTION OF THE PREFERRED EMBODIMENTS

Figure 1A:
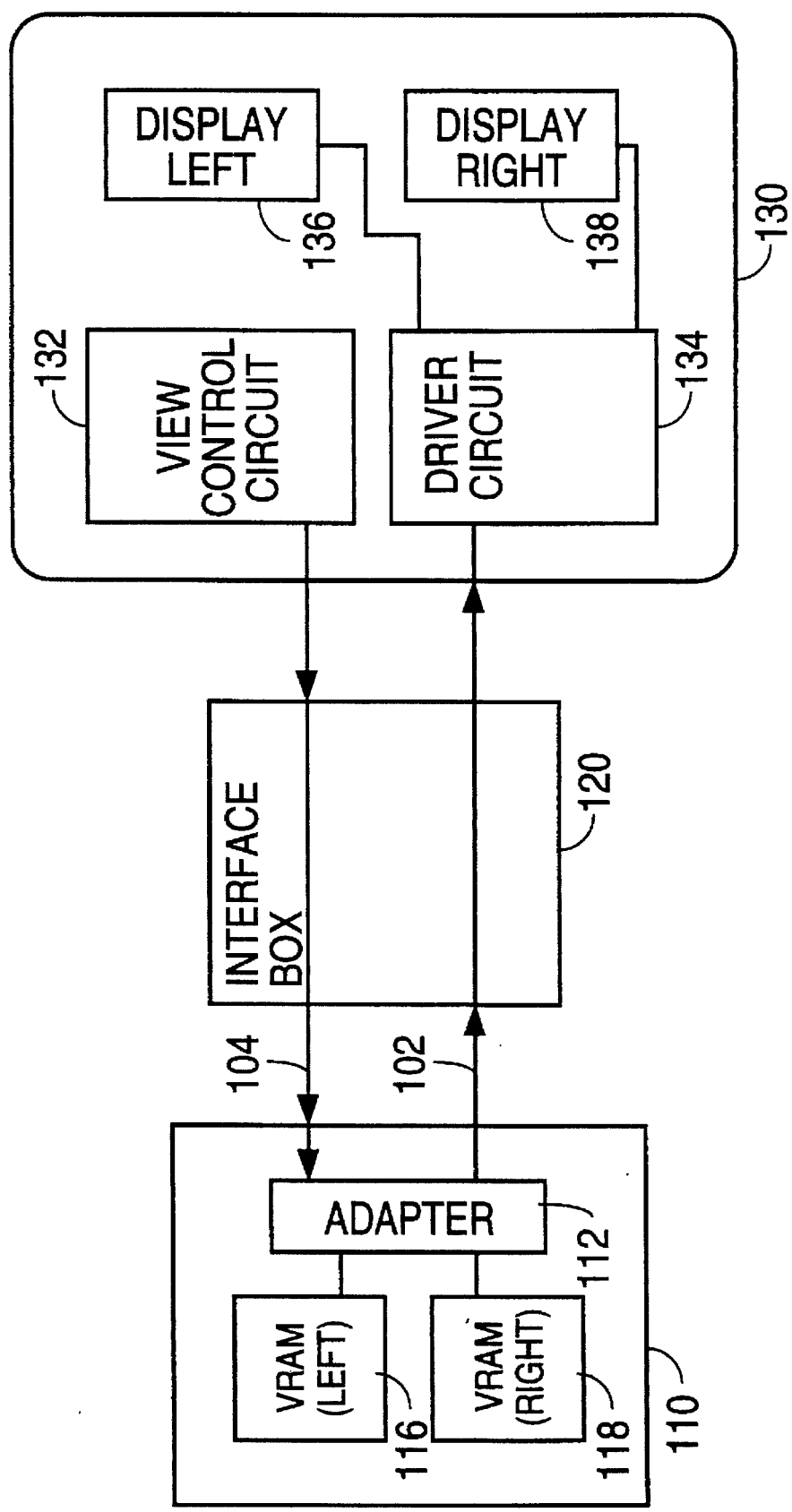
FIGS. 1A and 1B show a block diagrams of stereoscopic video display systems in accordance with the invention.

FIG. 1A shows an embodiment of a stereoscopic video display system in accordance with the present invention. The system includes a video signal source 110, an interface box 120, and a head mounted display 130. Video signal source 110 may for example be a conventional computer or video game console executing a program (video game). In one embodiment, video signal source 110 (only relevant portions of which are shown in FIG. 1A) is a commercially available SEGA GENSIS™ video console executing a program provided by a game cartridge or a CD ROM drive unit.

Digital systems such as computers or game consoles typically employ VRAM (video random access memory) to store a digital representation of a video image. VRAMs 116 and 118 are frame buffers which store digital representations of respectively a left view and a right view generated according to the program being executed by video signal source 110. VRAM 116 and 118 each store a single digitized video frame. In other embodiments, each VRAM may hold more or less data than a video frame.

Two VRAMs 116 and 118 provide a convenient way to segregate and store left and right views for stereoscopic images. A virtual reality program can draw left and right views directly into the respective left and right VRAM 116 and 118. The views are stored in VRAM 116 and 118 for future revision, and one view can be changed while the other view is being displayed. However, video signal sources in accordance with the invention are not restricted to two VRAMs. A single VRAM can be used for stereoscopic images if the video signal source can change or exchange the data in the single VRAM fast enough to provide a left view or a right view when needed by a video adapter 112. A single VRAM can also be used to supply monoscopic video where no swapping of views is necessary. With more than two VRAMs, the video signal source can create multiple frames before the frames are needed for display purposes.

Video adapter 112 converts digital images in VRAM 116 and 118 into a video signal which is provided on output line 102. The video signal may be provided in any desired format. The most common formats are conventional analog video signals carried on a single line, for example, an NTSC, PAL, RGB, or HDTV signal. The video signals conventionally contain a series of video signal frames, each frame representing a still image. The frames are supplied and displayed at a fixed refresh rate, such as 50 Hz or 60 Hz. The changing data held in VRAM 116 and 118 changes successive frames and can simulate a smoothly moving image. Adapters such as adapter 112 which generate an analog video signal from digital image data, are well known in the art, and commonly used in computers and video game consoles.

Figure 1B:
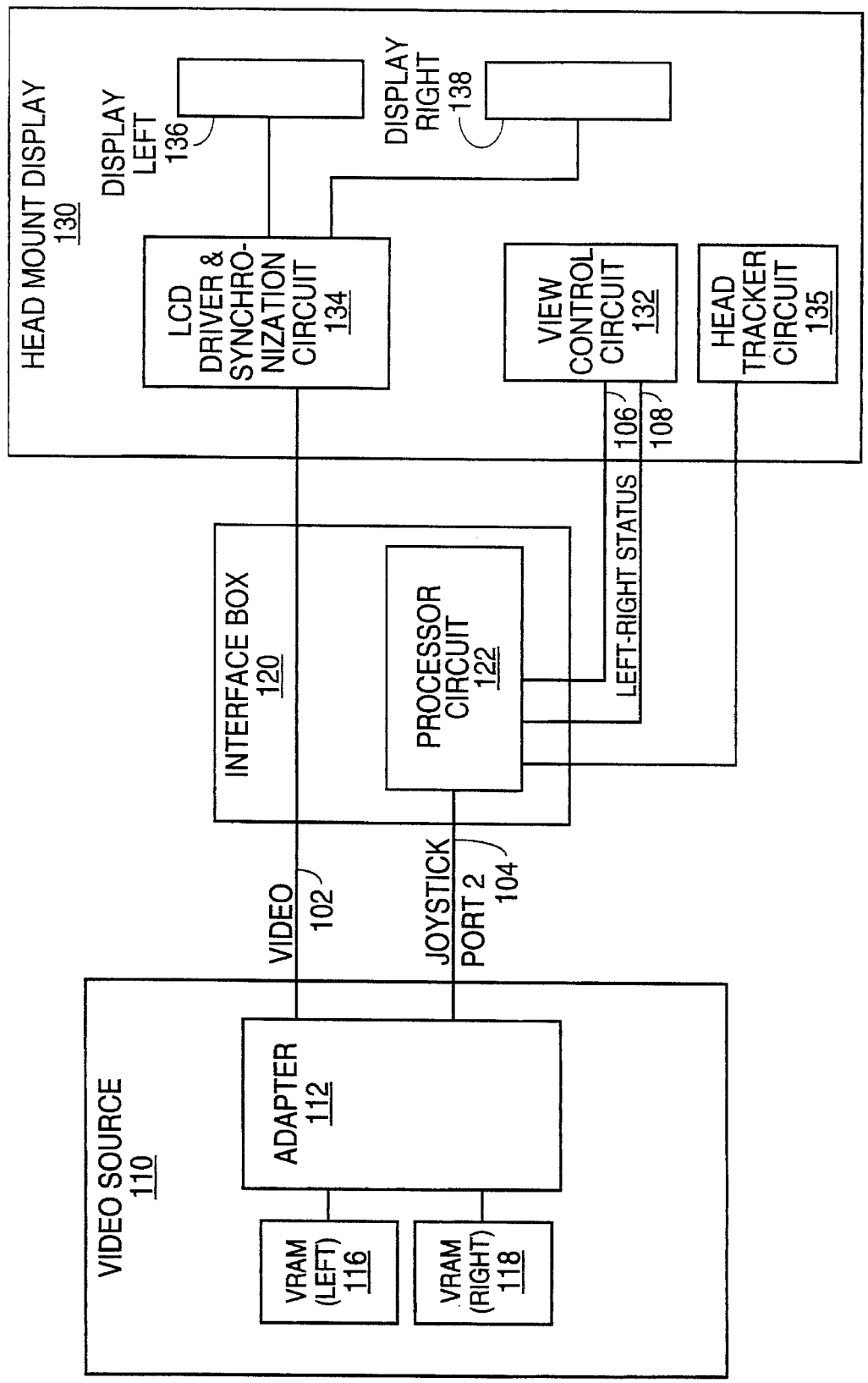

Interface box 120 and head mounted display 130 together constitute a stereoscopic display. The video signals from adapter 112 pass through interface box 120 to head mounted display 130. In the embodiment of FIG. 1A, interface box 120 is merely a junction box for lines and cables from video signal source 110 and head mounted display 130. In other embodiments, interface box 120 is eliminated so that lines directly connect video signal source 110 and head mounted display 130. In still other embodiments, circuitry such as view control circuit 132 and display driver 134 are located in interface box 120 instead of in head mounted display 130 as shown in FIG. 1A. FIG. 1B shows a block diagram of an alternate embodiment which includes a processor circuit 122 that controls communications between head mounted display 130 and video source 110. Placing circuitry in interface box 120 instead of in head mounted display 130 lightens head mounted display 130 but increases the amount of signal routing.

Video signal source 110 may be a computer or a game console not specifically designed for use with a stereoscopic display. Adding specialized stereoscopic display circuitry to video source 110 may be difficult, particularly when source 110 is a game console which has no provision for add-on devices in the game console cabinet. Accordingly, placing any additional circuitry in the stereoscopic display makes adding stereoscopic capabilities to a game console easier, and reduces the cost of a game console without stereoscopic capabilities.

Head mounted display 130 contains a left video display 136 and a right video display 138. Video displays 136 and 138 may each be, for example, a liquid crystal display (LCD), a small cathode ray tube (CRT), or a projection system. Driver circuit 134 drives video displays 136 and 138 by converting the video signal from video signal source 110 to the proper format for video displays 136 and 138 and providing the converted signals to selected displays 136 and/or 138.

Video displays 136 and 138 are mounted on a helmet or other head gear (not shown) and positioned so that the left eye of a viewer wearing the helmet sees left video display 136, and the right eye of the viewer sees right video display 138. Many different optical systems, for example, a magnifier eyepiece lens system directly between each of displays 136 and 138 and the viewer's eyes or a focusing mirror system which permits viewing of a reflected image, may be employed for viewing video displays 136 and 138. U.S. patent application Ser. No. 07/832,237, by Richard Dennis Rallison, entitled "Optically Corrected Helmet Mounted Display" is incorporated by reference herein in its entirety and discloses a heads up display that can project an image from video displays 136 and 138 to the eyes of the viewer and can combine the projection with a direct view of the surrounding environment.

The stereoscopic display is operable in two modes, a stereo mode and a mono mode. In stereo mode, left and right displays 136 and 138 are configured to display a stereoscopic image. In mono mode, left and right displays 136 and 138 are configured to display a monoscopic image. The operating mode may be set for example by a switch provided either on head mounted display 130 or on interface box 120. The mode may also be set by command signals from video signal source 110. A protocol for sending such command signals to head mounted display is disclosed in the U.S. patent application entitled "Communication Protocol", incorporated by reference above.

In the embodiment shown in FIG. 1A, driver circuit 134 routes video signal to left video display 136 and/or right video display 138, and controls which display 136 or 138 displays the image represented by the signal. For example, in stereo mode, a video frame is shown on left video display 136, then the following frame of video frame is shown on right video display 138, then a frame on left display 136, and so on alternately showing frames on the left then right displays. In one embodiment, driver circuit 134 controls the displays by alternately routing video information to the left display 136 then the right display 138. In another embodiment, driver circuit 134 routes video information to both displays 136 and 138 simultaneously and enables one display 136 or 138 while disabling the other display 138 or 136 so that left and right views are only shown on the correct display. In still another embodiment, driver circuit 134 route video signals to both displays and view control circuit 132 provides the signals which enables or disables display 136 or 138.

In the embodiment of FIG. 1A, view control circuit 132 sends a left-right signal to source 110 along line 104. The left-right signal may for example be a digital signal having a value of high or low, which indicates a desired view. In the stereo mode, view control circuit 132 can either control driver circuit 134 so that driver circuit 134 operates video displays 136 and 138 in agreement with the left-right signal, or can monitor driver circuit 134 and provide a left-right signal in agreement with the activated display 136 or 138.

In the embodiment of FIG. 1B, processor circuit 122 in interface box 120 controls communication between head mounted display 130 and video source 110. A single line 106 is sufficient to convey the left-right status signal to interface box 120. Processor circuit 122 communicates with video source 110 through a bus 104 and an I/O port. In an embodiment where video source 110 is a game console such as a SEGA GENESIS™ video game console, an I/O port which is commonly used for a joystick provides as interface for communicating the left-right status and communicating data to and from processor circuit 122. Such communications can include transmission of the left-right signal from view control circuit 132, data from a headtracker circuit 135, or a stereo-mono control signal for controlling whether view control circuit 132 is in stereoscopic or monoscopic mode. Video source 110 provides either the left or the right view according to the left-right signal so that in stereo mode, the views are synchronized, left or right, with the active display, left display 136 or right display 138.

In video signal source 110, a game program controls the video image according to the state of the left-right signal. Typically, a memory location in video signal source 110 is dedicated to holding the base address of a memory block which holds the image data used by adapter 112. Adapter 112 retrieves the base address from the dedicated memory location before generating each video frame. The game program changes from left view to right view by writing an appropriate address into the dedicated memory location. The game program can also change the image by changing data in the VRAM 116 or 118 used by adapter 112. In an alternative embodiment, a multiplexer selectably connects VRAM 116 or 118 to adapter 112. In still another alternative embodiment, more than one adapter, each addressing a different location in VRAM 116 or 118, may have output video signals routed by a multiplexer which selects the video signal that is sent to the stereoscopic display.

The value of the left-right signal depends on the operating mode of display driver circuit 134 and view control circuit 132 and on which of the displays 136 or 138 is active. In stereo mode, view control circuit 132 provides a left-right signal which when left display 136 is active, requests that video signal source 110 provides a left view, and when right display 138 is active, requests that video signal source 110 provides a right view.

In mono mode, both displays 136 and 138 are activated, and view control circuit 132 provides a left-right signal that always requests the same view. Accordingly, left display 136 and right display 138 display the same frames, and both eyes of a viewer see the same view (monoscopic video.) Thus in the mono mode, a monoscopic video display such as a television coupled to video signal output line 102 displays a clear image, and both the head mounted display and the monoscopic video display may be simultaneously connected to video signal source 110. In stereo mode, a monoscopic display such as a television coupled to line 102 would undesirably flash left and right images and provide a jumpy image that is difficult to view.

In one particular embodiment, adapter 112 provides a standard NTSC or PAL video signal, and driver circuit 132 causes one video display 136 or 138 to display a full frame before causing the other of video display 136 or 138 to display a frame. The change from one video display to the other occurs during the video vertical blanking interval. Driver circuit 134 monitors the video signal to determine when vertical blanking occurs. View control circuit 132 receives from driver circuit 134 a signal indicating the vertical blanking interval and then sends the left-right signal requesting the correct view for the next frame.

In another embodiment, video signal source 110 sends a request for information to the stereoscopic display during the vertical blanking interval, and view control circuit 132 responds by providing data including the left-right signal.

In stereoscopic mode, while driver circuit 134 activates one of the video displays 136 or 138, the other of video displays 136 or 138 is not displaying a new frame so that one video display 136 or 138 shows even frames from the video signal and the other video display 138 or 136 shows odd frames from the video signal. The frame rate (or refresh rate) of displays 136 and 138 is therefore half the standard rate, for NTSC, thirty frames per second instead of sixty frames per second. For most animation, thirty frames a second is sufficient to simulate smooth motion. LCDs, which retain images longer than do CRTs, reduce flickering caused by fading of an image between refreshes.

FIG. 2 shows video signal source 110 coupled to a monoscopic video display 230. Monoscopic video display 230 may be a television, a monitor, or any display compatible with the video signal on line 102. Lead 104, which is for accepting a left-right signal, is not connected. Accordingly, no left-right signal is provided to switch the video signal between a left and a right view. Video signal source 110 may have a pull-up or pull-down circuit that ensures the voltage on line 104 is constant when no external signal is applied to line 104. The video signal from adapter 112 provides the same view, for example always the left view, because the left-right signal is constant. The resulting video signal provided to monoscopic display 230 represents a constant view (either left or right) and is at the standard frame rate of the video signal source 110. Accordingly, video source 110 may be used with monoscopic displays.

Figure 3:
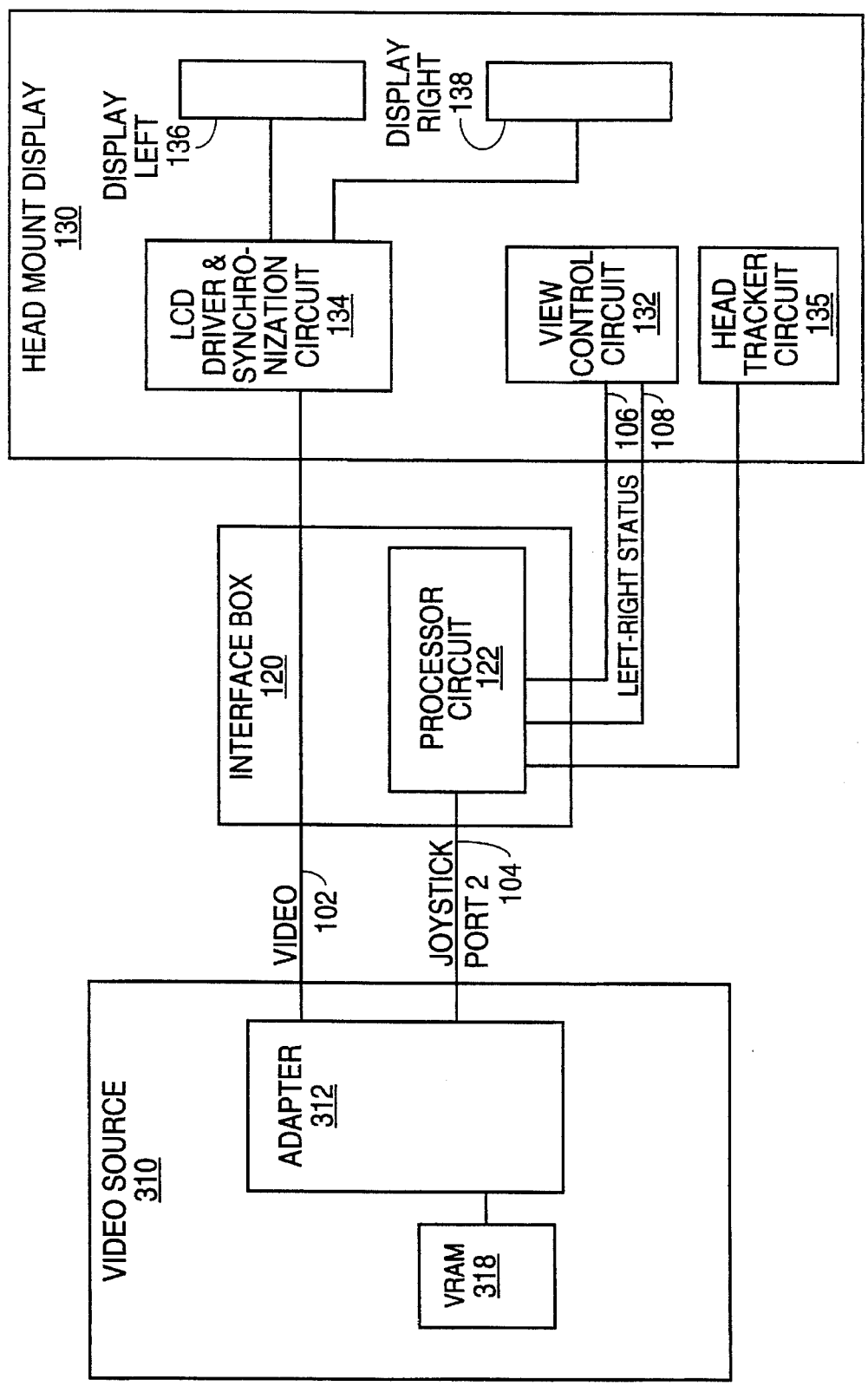
FIG. 3 shows a block diagram of a monoscopic video signals source connected to a stereoscopic video display in accordance with the invention.

FIG. 3 shows a block diagram of stereoscopic head mounted display 130 and interface box 120, coupled to monoscopic video signal source 310. Video signal source 310 differs from video signal source 110 of FIG. 1, in that video signal source 310 does not generate a left and a right view. Video signal source 310 may be for example a video game console identical to the video game consoles disclosed in FIG. 1, except the video game console in FIG. 3 is executing a program which does not implement stereoscopic video.

A program which is not designed for stereoscopic video but which uses signals on line 104, may misinterpret left-right signals. If the program is incorrectly interpreting the left-right signal on line 104, the user can disconnect line 104 from interface box 120. Alternatively, stereoscopic display 130 can use a communications protocol which prevents sending of a left-right signal if source 110 does not respond properly.

Video signal source 310 provides a conventional video signal that does not switch between left and right views, therefore left and right displays 136 and 138 show the same view. Even if head mounted display 130 is in stereo mode and routes the video signal alternately to left display 136 then right display 138, both displays 136 and 138 show the same view (separated in time by one frame). Accordingly, the system automatically adjusts to provide a monoscopic video display if video signal source 310 only provides monoscopic video.

Figure 4:
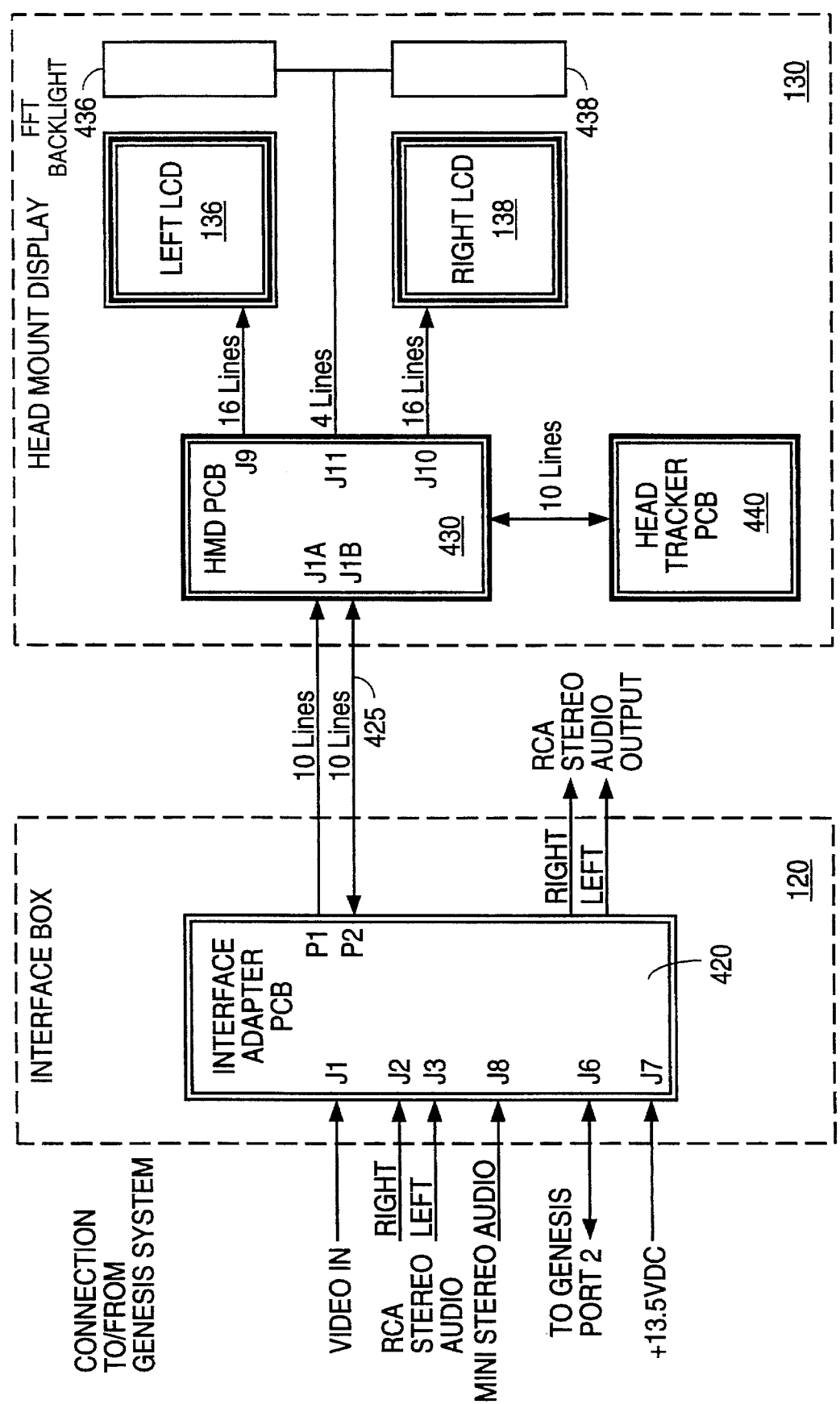
FIG. 4 shows a block diagram of an embodiment of an interface box and a head mounted display in accordance with the present invention.

FIG. 4 shows a block diagram of an embodiment of interface box 120 and head mounted display 130 which are used in a system that includes a SEGA GENESIS™ video game console (not shown) as the video signal source. SEGA GENESIS™ video game consoles are widely available commercially and not described in detail here. The SEGA GENESIS™ video game console supplies a video signal, a left audio signal, and a right audio signal through RCA jacks J1, J2, and J3 respectively to a printed circuit board (PCB) 420. Audio signals may also be provided to PCB 420 from a device such as a CD ROM drive through a stereo mini jack J8. Two-way communications with the Genesis, described in more detail below, are conducted through port J6. Port J7 receives a constant 13.5 volt DC power supply.

PCB 420 is a communications interface and provides video and audio signals to peripheral devices such as head mounted display 130. Analog video and audio signals are provided from PCB 420 through port P1 to port J1A of a PCB 430 mounted on head mounted display 130. Two way digital communication is provided on bus 425 between PCBs 420 and 430 via ports P2 and J1B. PCB 430 contains a view control circuit and a display driver, and controls left and right video displays 136 and 138 (and back lights 436 and 438 for the displays) via ports J9, J10, and J11.

Figure 5:
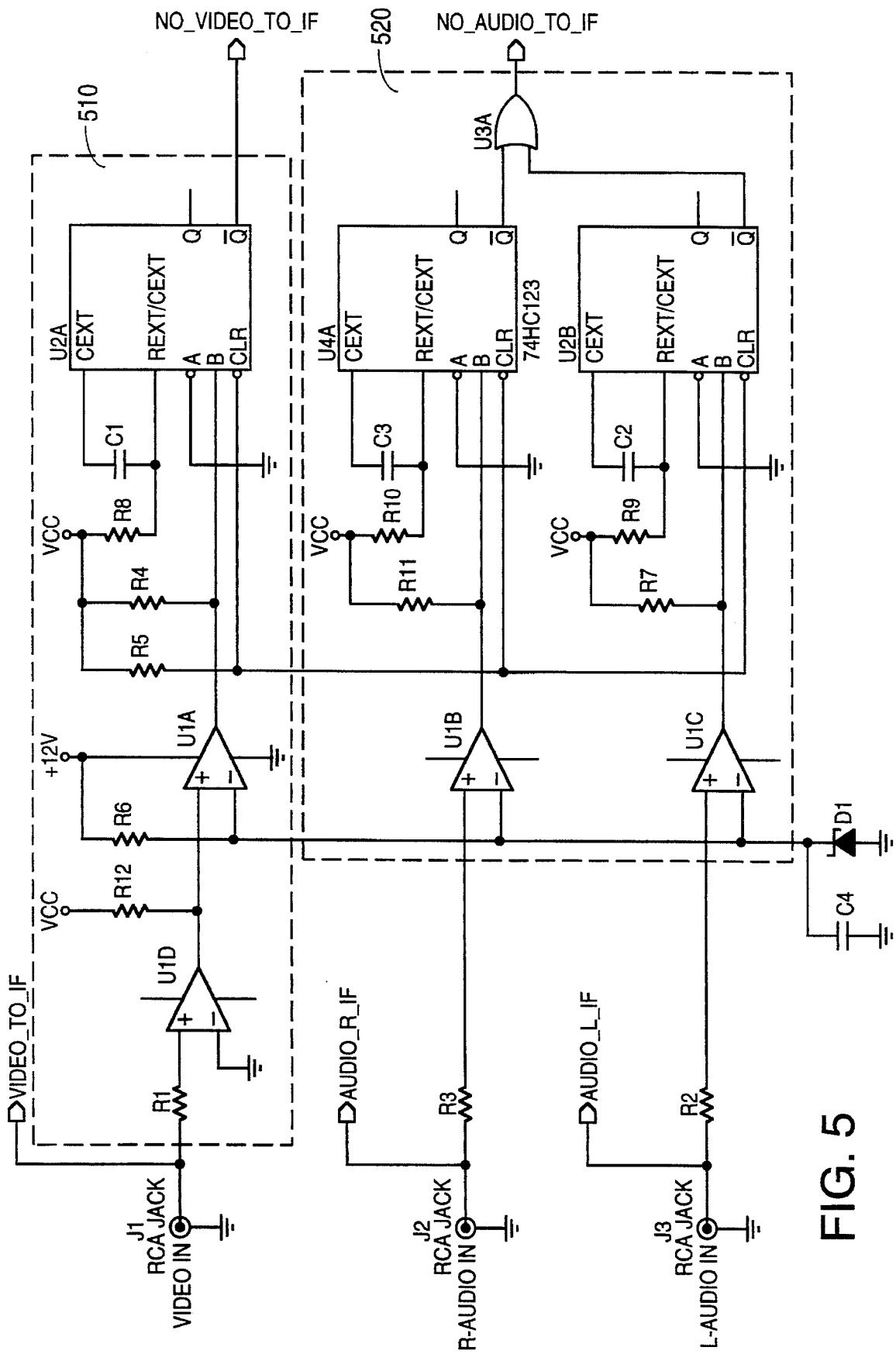
FIGS. 5–14 show circuit diagrams for the embodiment of FIG. 4.
Figure 6:
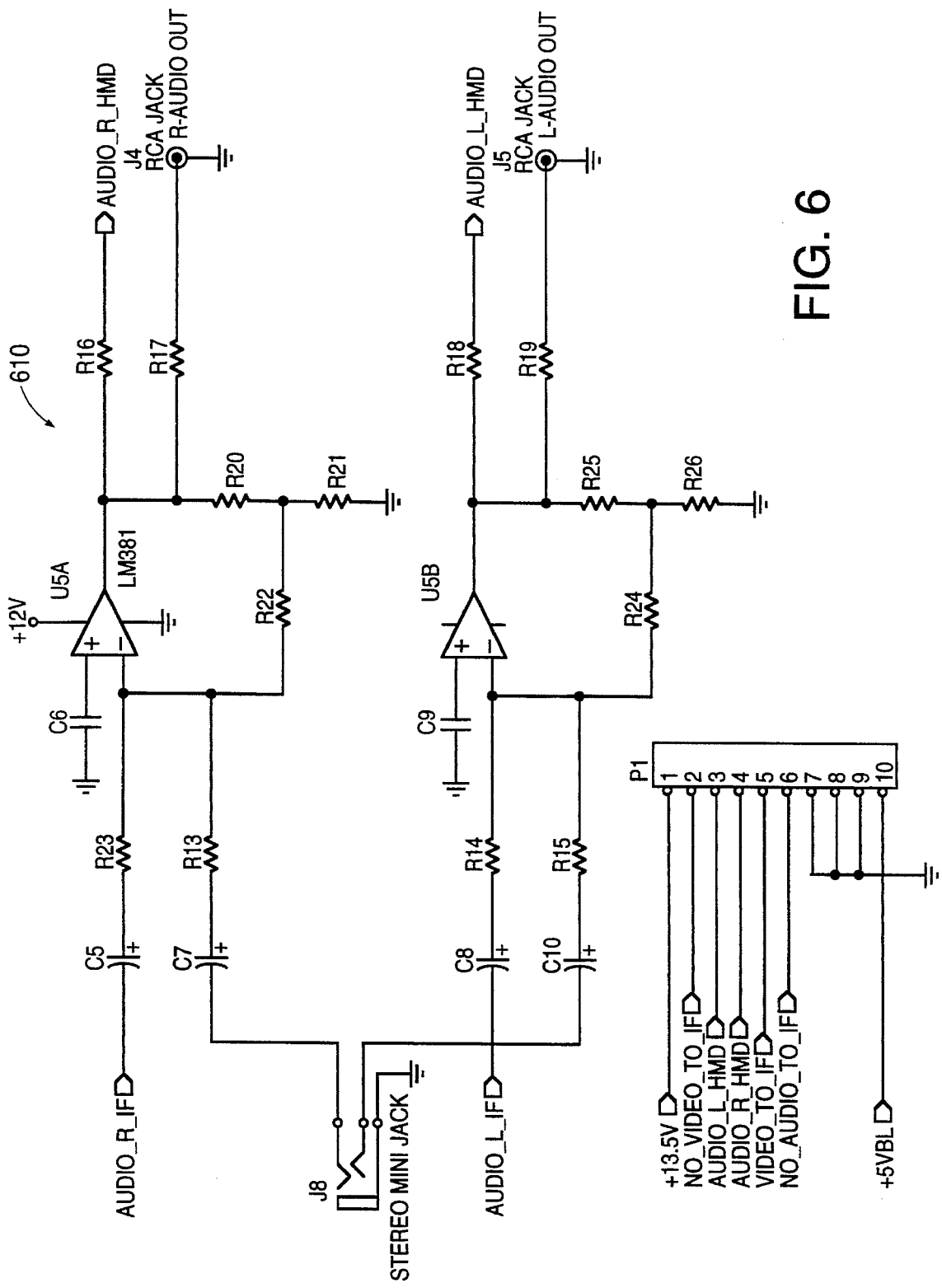
Figure 7A:
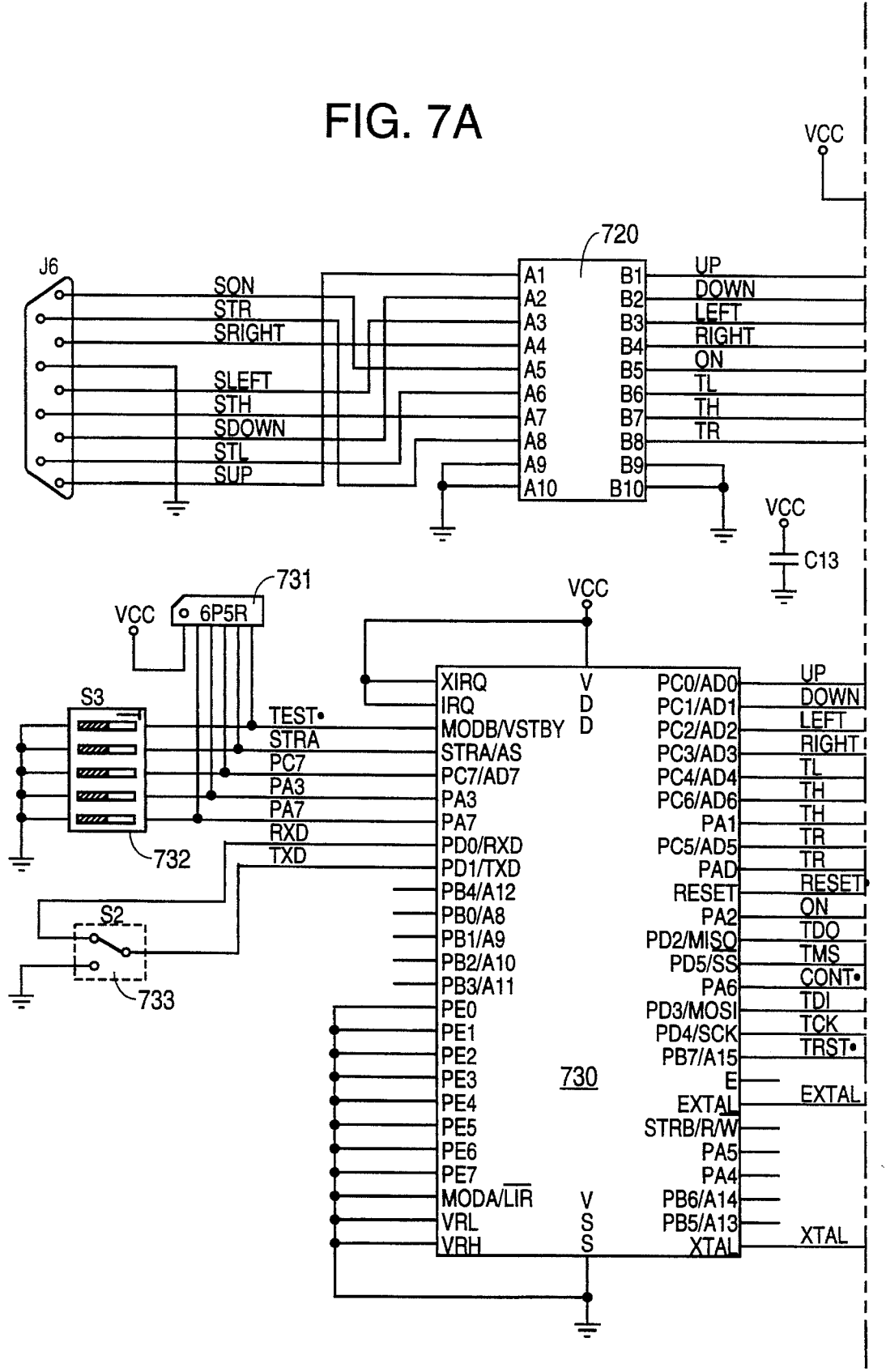
Figure 7B:
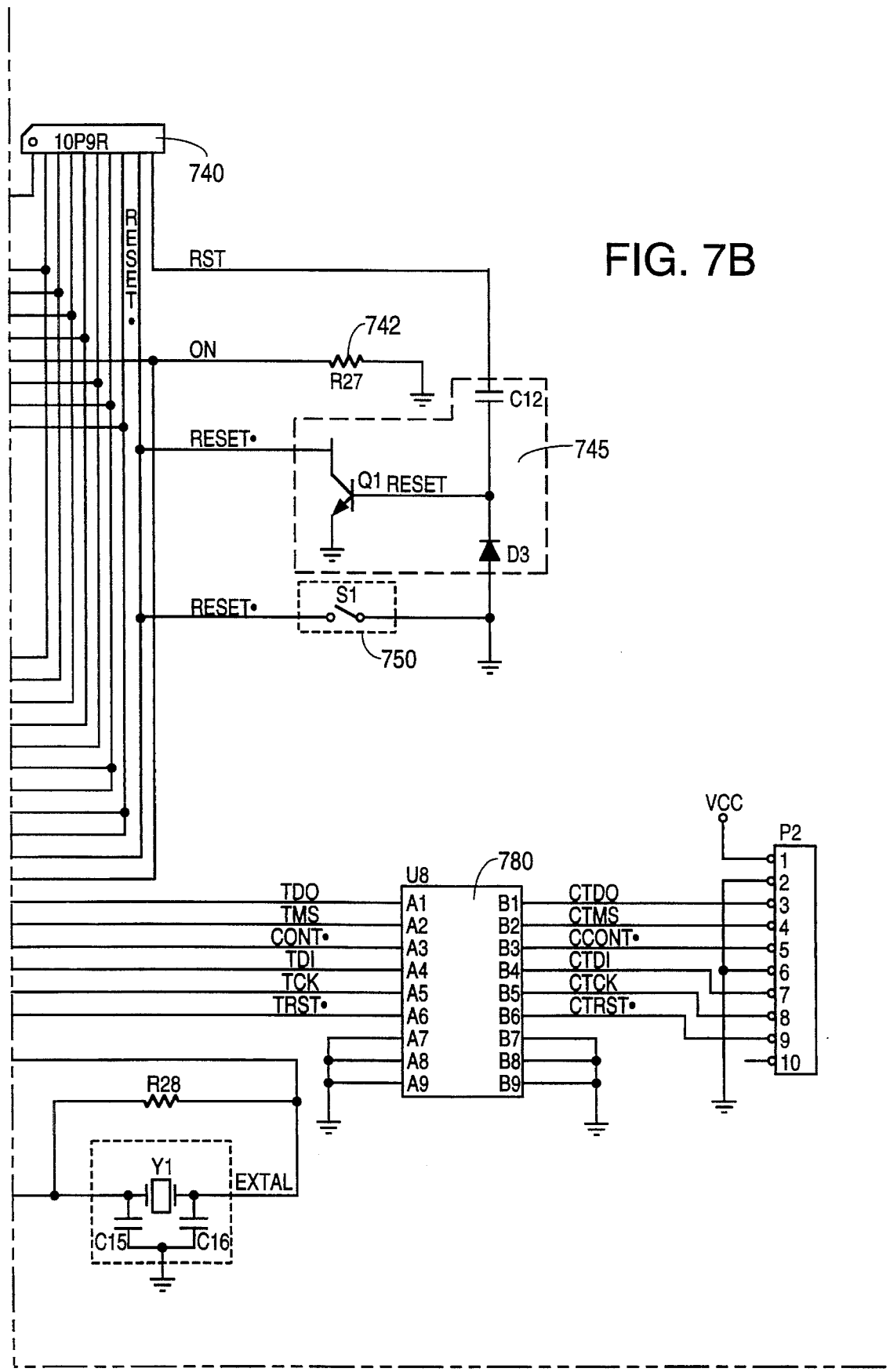

FIGS. 5–7 show circuit diagrams of the elements on PCB 420 of FIG. 4. The circuit in FIG. 5 routes the video signal from jack J1 onto line VIDEO_TO_IF for transmission to head mounted display 130. Circuitry 510 provides a signal on line NO_VIDEO_TO_IF indicating whether a video signal is being received on jack J1. Circuitry 520 similarly provides a signal indicating if an audio signal is being received from the video game console on either jack J2 or J3.

FIG. 6 shows circuitry 610 which provides the audio signals either from jacks J2 and J3 or stereo mini jack J8 to port P1 and audio jacks J4 and J5. The audio signals may be provided through lines AUDIO_R_HMD and AUDIO_L_HMD to headphones (not shown) in the head mounted display 130 or to an external amplifier (not shown) through jacks J4 and J5. Also shown in FIG. 6 are the lines which connect to port P1 and supply signals for head mounted display 130. Lines VIDEO_TO_IF, AUDIO_L_HMD, and AUDIO_L_HMD carry analog video and audio signals. Lines NO_VIDEO_TO_IF and NO_AUDIO_TO_IF carry digital signals indicating whether interface box 120 is receiving video or audio signals. The remaining lines connected to port P1 carry fixed reference or power supply voltages.

In FIG. 7, circuitry 710 provides power supply voltages. FIG. 7 also shows interface circuitry which controls communications. Connector J6 connects to the second joystick port of the video game console via a standard cable. Static filter 720 filters out noise in the cable connected to the video game console. In one embodiment, static filter 720 is a part No. 4420R-601-470/500 available from Bourns, Inc.

When connector J6 is connected to the joystick port, the video game console pulls lines SON and ON high. When connector J6 is not connected to a joystick port, a pull-down resistor 742 pulls the voltage on line ON low. A microprocessor 730 senses a low signal on line ON when connector J6 is not connected, and resets the head mounted display and sensors to a default mode. In one embodiment, microprocessor 730 is an MC68HC711E9 available from Motorola. Reset switch 750 and debouncing circuit 745 connect line ON to ground and also reset the displays and sensors into the default mode. Pull-up resistors 740 fix the voltages on lines UP, DOWN, LEFT, RIGHT TL, TH, and TR when no external signals are applied to connector J6.

Connector P2 and static filter 780 are for connecting to head mounted display 130 which includes PCB 430 in FIG. 4, video circuitry 136, 138, 436, and 438, and head tracker 440. Head tracker 440 senses and provides angles indicating the orientation of head mounted display 130. Suitable head trackers are well known in the art and include sensors such as bubble levels and flux compasses which determine angles relative to the direction of gravity or the earth's magnetic field.

Memory in microprocessor 730 holds a program which implements a communications protocol used for communications between the video game console and head mounted display 130 (and/or other peripheral devices). The protocol includes formats for sending a left-right signal to the video game console, sending data to the Genesis, and sending configuration data to the head mounted display 130.

Information is asynchronously transferred between the video game console and interface box 120 according to the protocol. Communication protocol lines TR, TH, and TL carry handshaking signals, and lines UP, DOWN, LEFT, and RIGHT carry parallel signals representing a nibble of information. During a periodic data transfer from display 130 to the Genesis, one nibble sent to the Genesis contains a bit which is the left-right signal that requests either a left or right view from the Genesis. Other nibbles in the data packet contain information such as orientation angles measured by head tracker 440. During transfer of command packets from the Genesis to interface box 120, some nibbles contain bits which indicate how to configure head mounted display 130, for example one bit indicates either stereo mode or mono mode operations. Further detail of the communications protocol is provided in the U.S. patent application entitled "Communication Protocol" incorporated by reference above. Microprocessor 730 also provides the signals necessary for communication with head mounted display 130 and other peripherals connected to port P2.

Pull-up resistors 731 and switches 732 and 733 configure microprocessor 730 for testing.

FIGS. 8–14 show circuits contained in head mounted display 130.

Figure 8A:
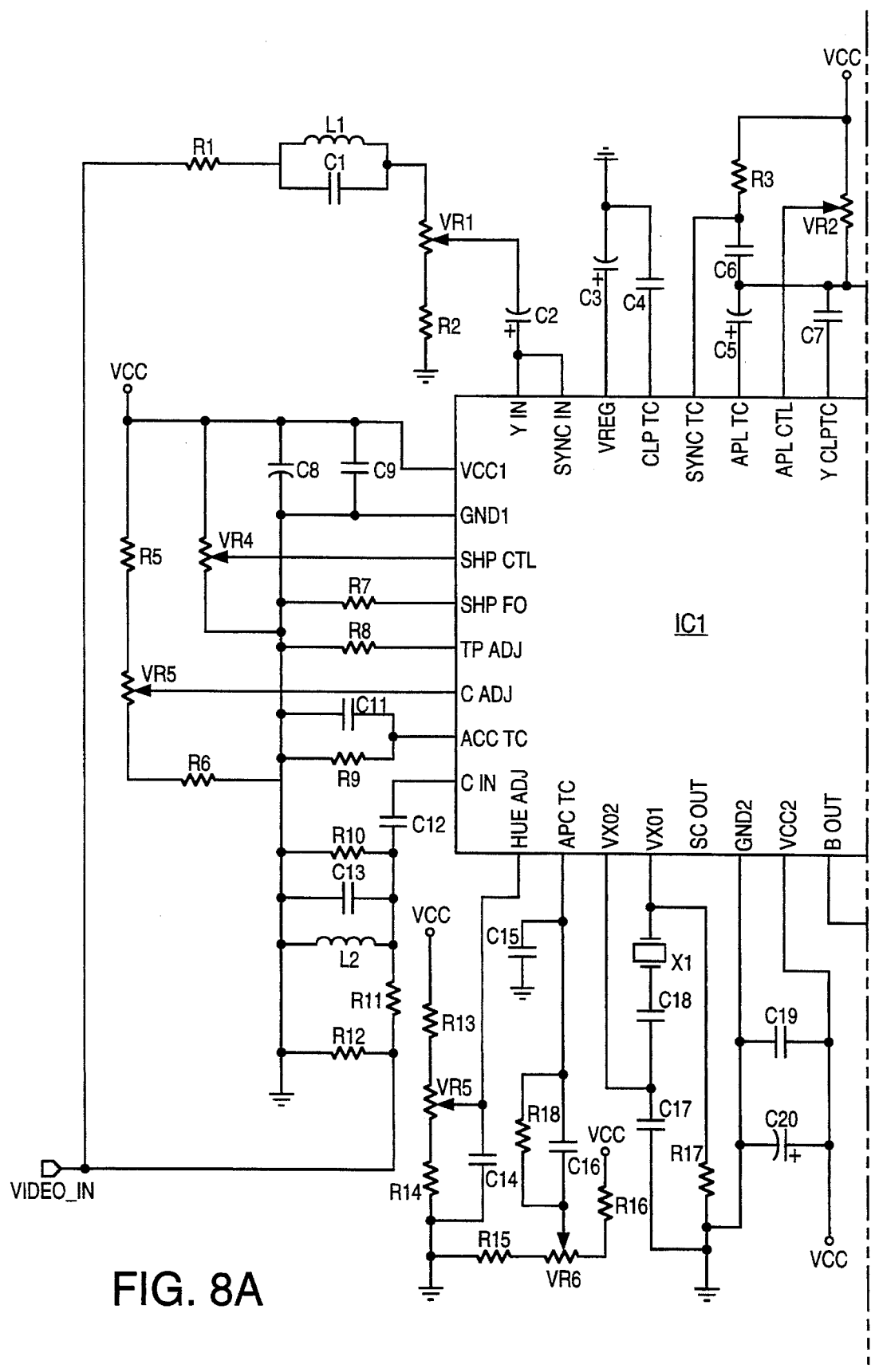
Figure 9A:
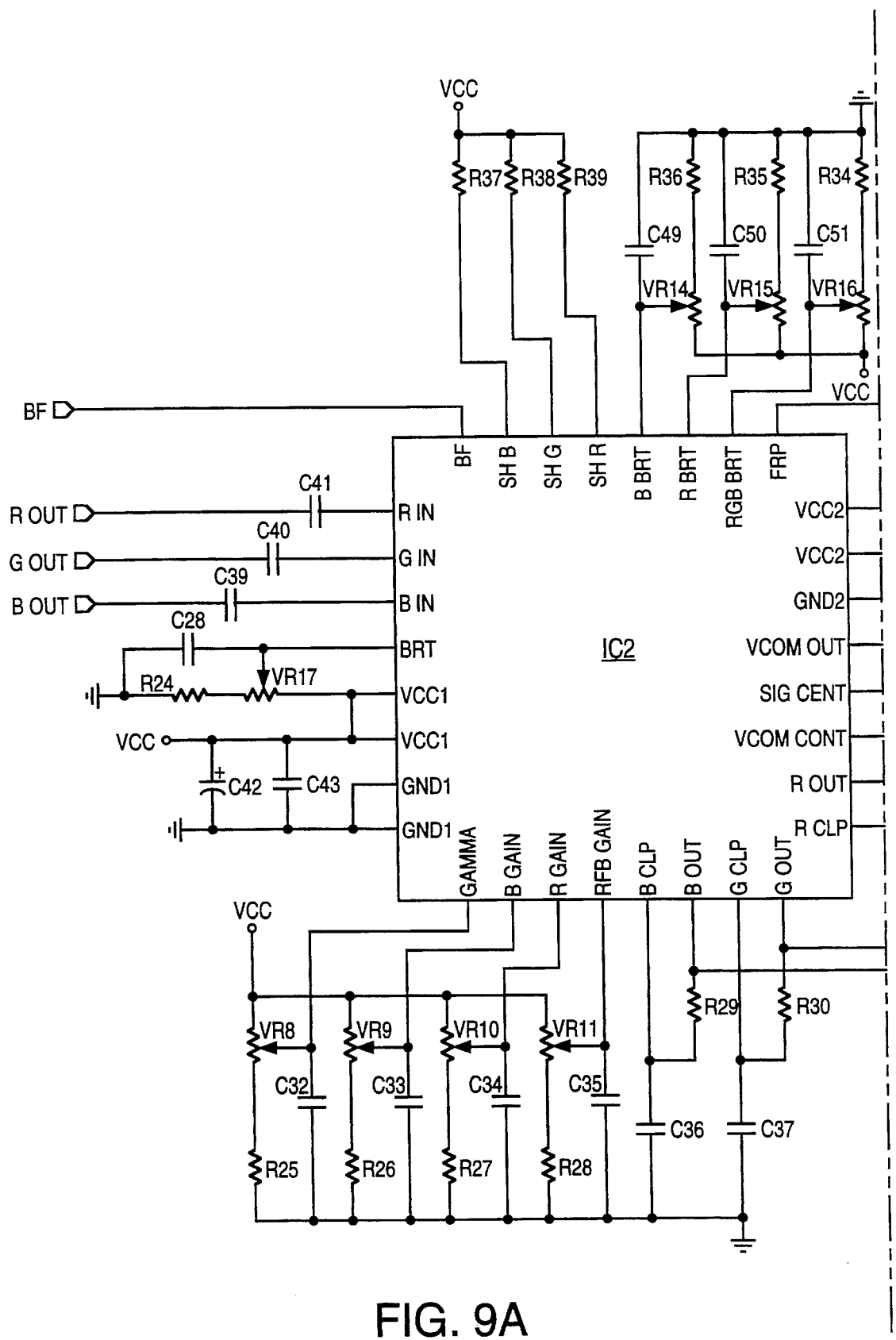
Figure 9B:
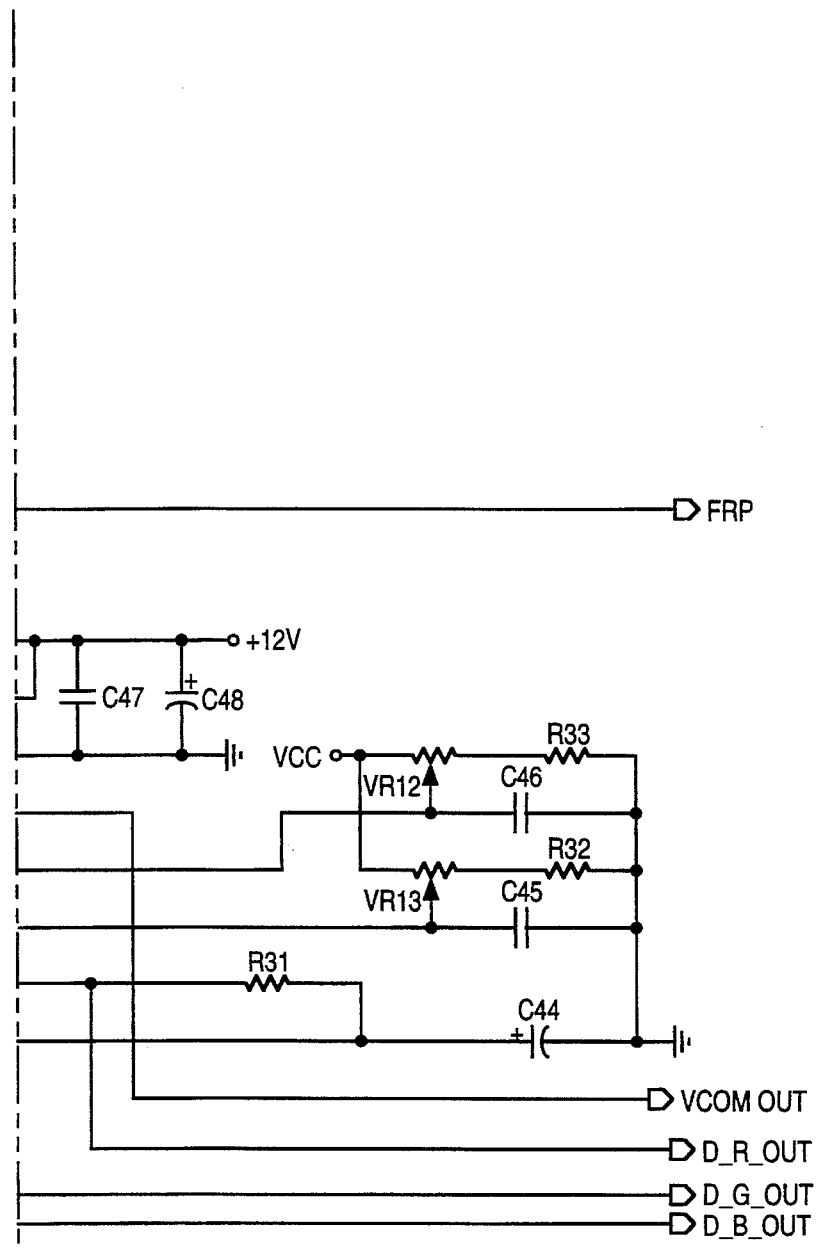
Figure 10A:
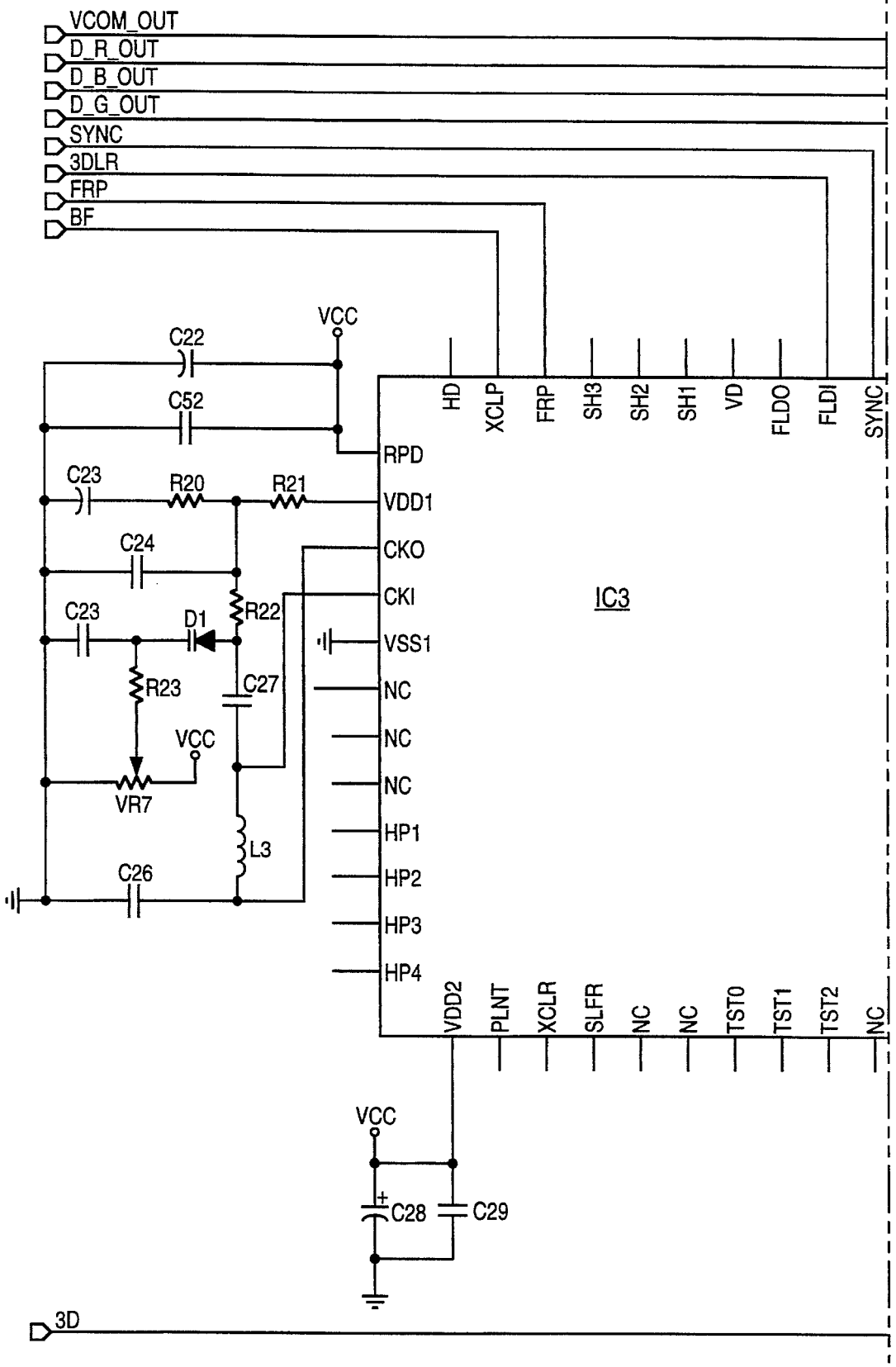
Figure 10B:
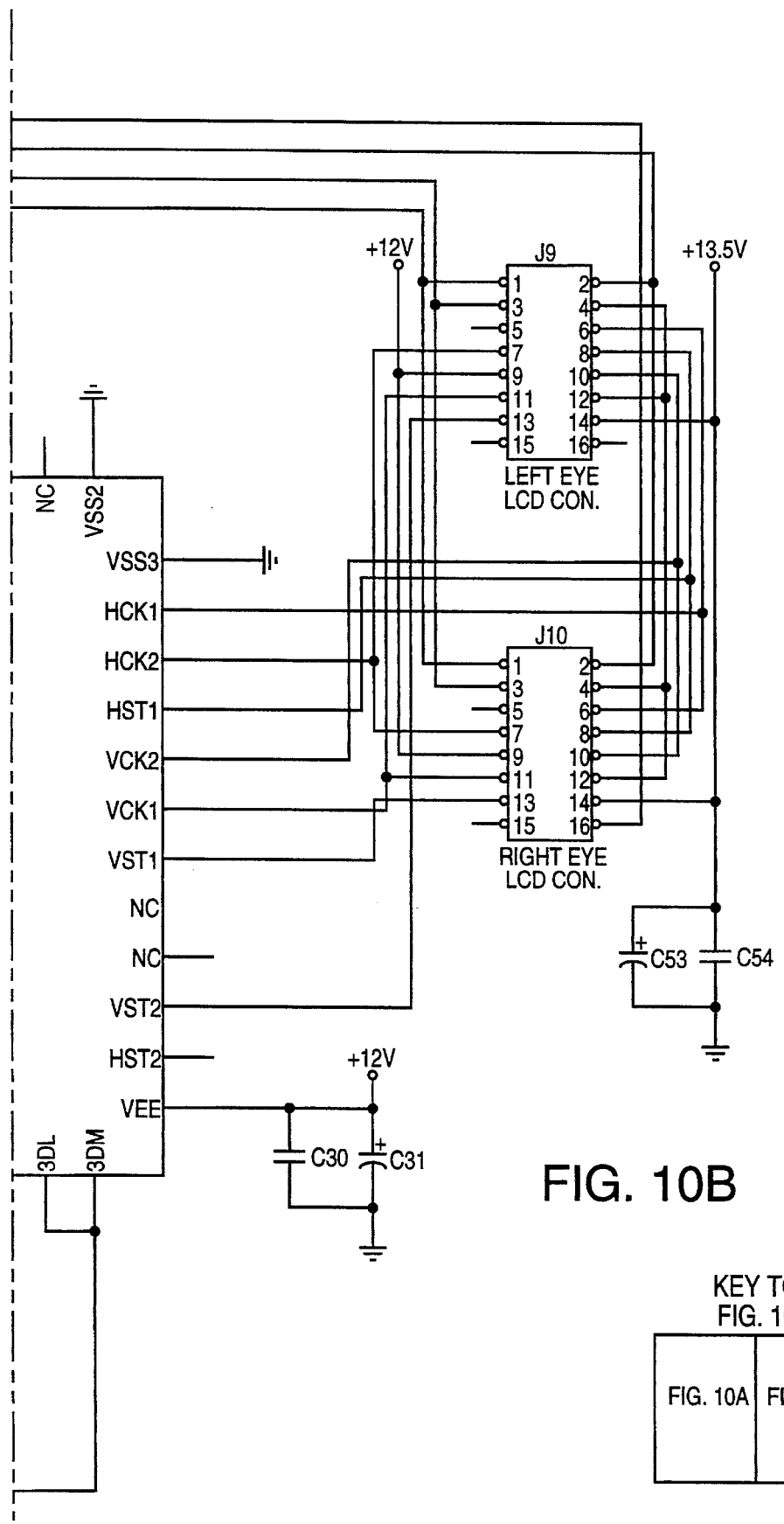

FIGS. 8, 9, and 10 show a circuit diagram of a display driver and a view control circuit including chips IC1, IC2, and IC3 which are respectively part nos. CXA1585Q, CXA1515Q, and CXD2403R each commercially available from Sony.

As shown in FIG. 8, a video signal is provided from interface box 120 through the port J1A and a line VIDEO_IN. IC1 is an RGB decoder which converts the video signal on line VIDEO_IN into red, blue, and green signals on output lines R_OUT, B_OUT, and G_OUT and a synchronization signal on line SYNC. IC2, in FIG. 9, is a RGB driver that converts the red, blue, and green signals from lines R_OUT, B_OUT, and G_OUT into LCD panel compatible red, blue, and green signals on lines D_R_OUT, D_B_OUT, and D_G_OUT and a frame start signal on line FRP. Line BF carries a burst flag signal. Line VCOM_OUT carries a vertical control signal.

IC3, in FIG. 10, is a timing generator which controls operation of IC1 and IC2 and a pair of Sony LCX003ZK 0.7-inch NTSC Color LCD panels which are connected to ports J9 and J10. Lines VST1 and VST2 carry signals from IC3 that control when a frame begins on the left or right LCD panel respectively. In mono mode, a signal on line 3D is high, and signals on VST1 and VST2 simultaneously activate both LCD panels so that both displays receive and display the video information. In stereo mode, signals on lines VST1 and VST2 alternately activate the left and then the right LCD panel in accordance with the left-right signal on line 3DRL so that LCD panels 136 and 138 alternate showing frames.

Figure 11A:
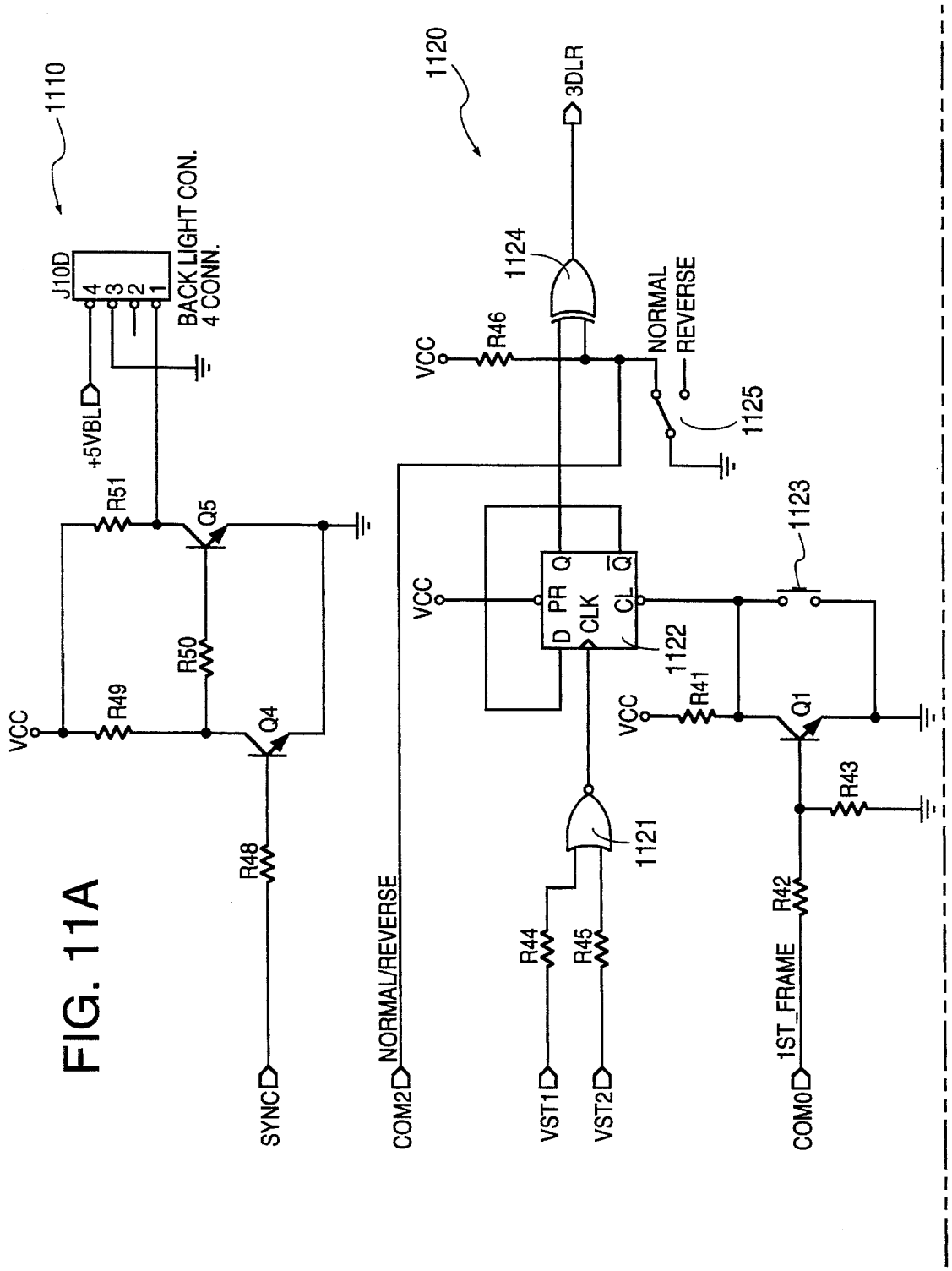
Figure 11B:
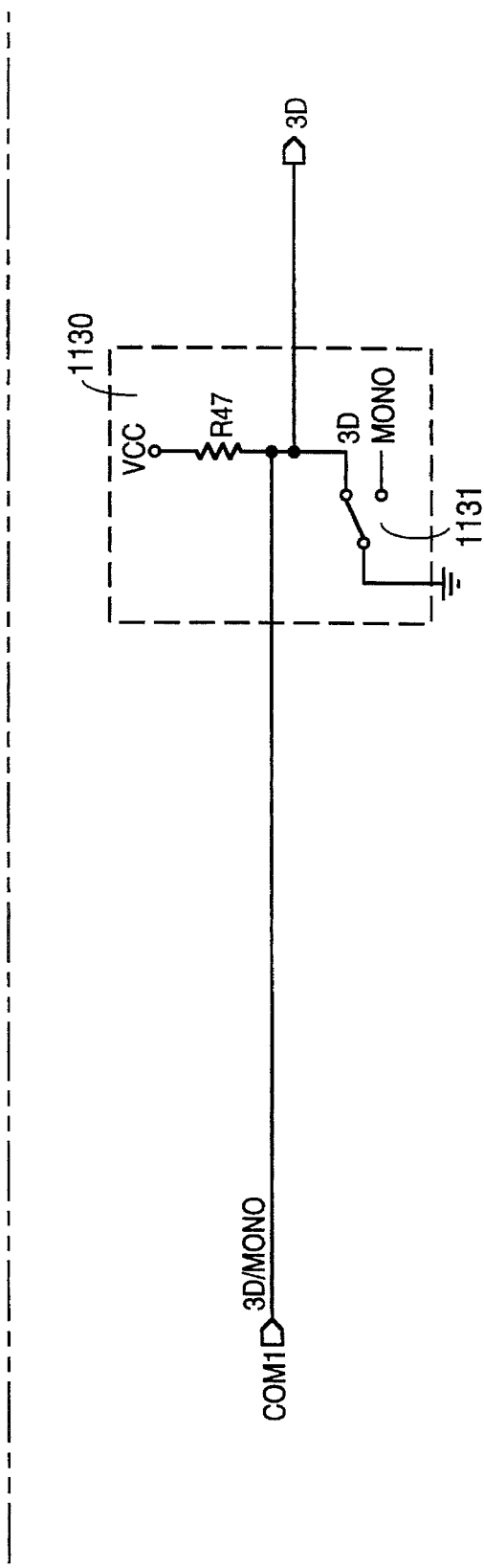

FIG. 11 shows a circuit 1110 for powering back lights 436 and 438 of LCD panels 136 and 138, a view control circuit 1120 for generating the left-right signal, and a circuit 1130 for selecting either mono mode or stereo mode video. In view control circuit 1120, a NOR gate 1121 provides a signal that triggers a D flip-flop 1122 every time either LCD begins a frame (every frame). Flip-flop 1122 has an inverted output lead $\overline{Q}$ connected to input lead D so that an output signal on lead Q changes every frame. The output signal from lead Q is provide to an EXOR gate 1124 and in normal operation, is inverted by EXOR 1124 to provide the left-right signal on line 3DLR.

Switch 1123 manually resets flip-flop 1122 to start a first frame on the left. The video game console, by sending appropriate data to microprocessor 730, can set the signal on line COM0 and reset flip-flop 1122. Switch 1125 changes the left-right signal between normal and reverse stereoscopic operation. Normal and reverse operation can also be configured by the video game console sending appropriate data to microprocessor 730 which, in turn, sets the signal on line COM2. In normal stereoscopic operation, the left video frames are sent to left video display 136, and the right video frames are sent to right video display 138. Reverse stereoscopic operation switches the video frames left for right, and typically would only be used for testing hardware and debugging software.

Mono mode and stereo mode are set through circuit 1130, manually by operating switch 1131 or through software by resetting the signal on line COM1.

Figure 12B:
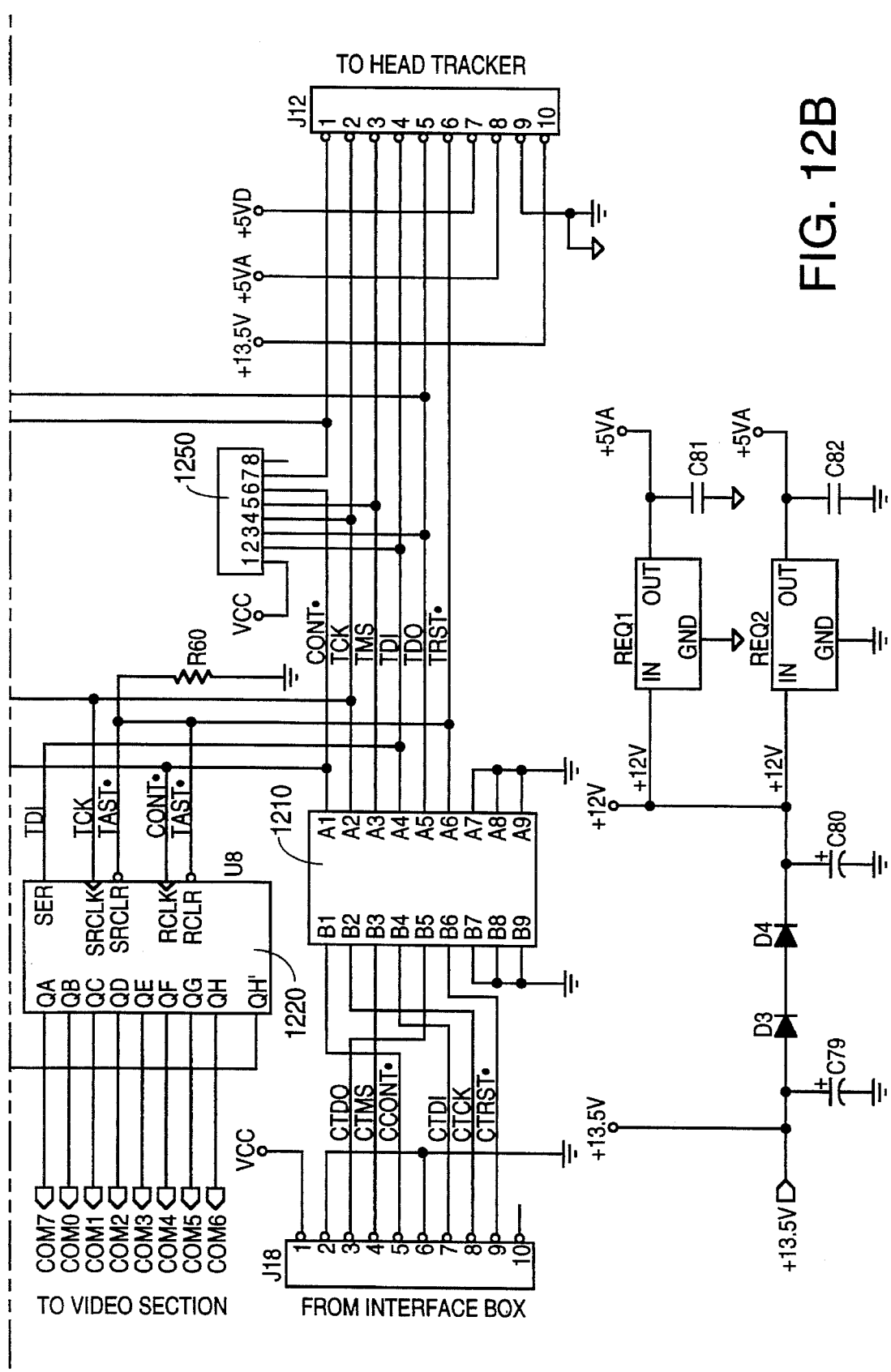

FIG. 12 shows a interface circuit in PCB 430 for communications with PCB 420. Signals are sent to and received from PCB 420 on port J1B. Noise is filtered out of the signals by filter 1210. Signals received from PCB 420 are transmitted either to command lines COM0–COM7 through serial-to-parallel converter 1220 or to head tracker 440 through port J12. Signals sent to PCB 420 come either from lines ERROR0–ERROR7 via parallel-to-serial converter 1230 or head tracker 440. When signals on lines FD00 and CONT are low, a signal on line TCK clocks bits from parallel-to-serial converter 1230 though logic gates 1240 and onto line TDO.

Figure 13A:
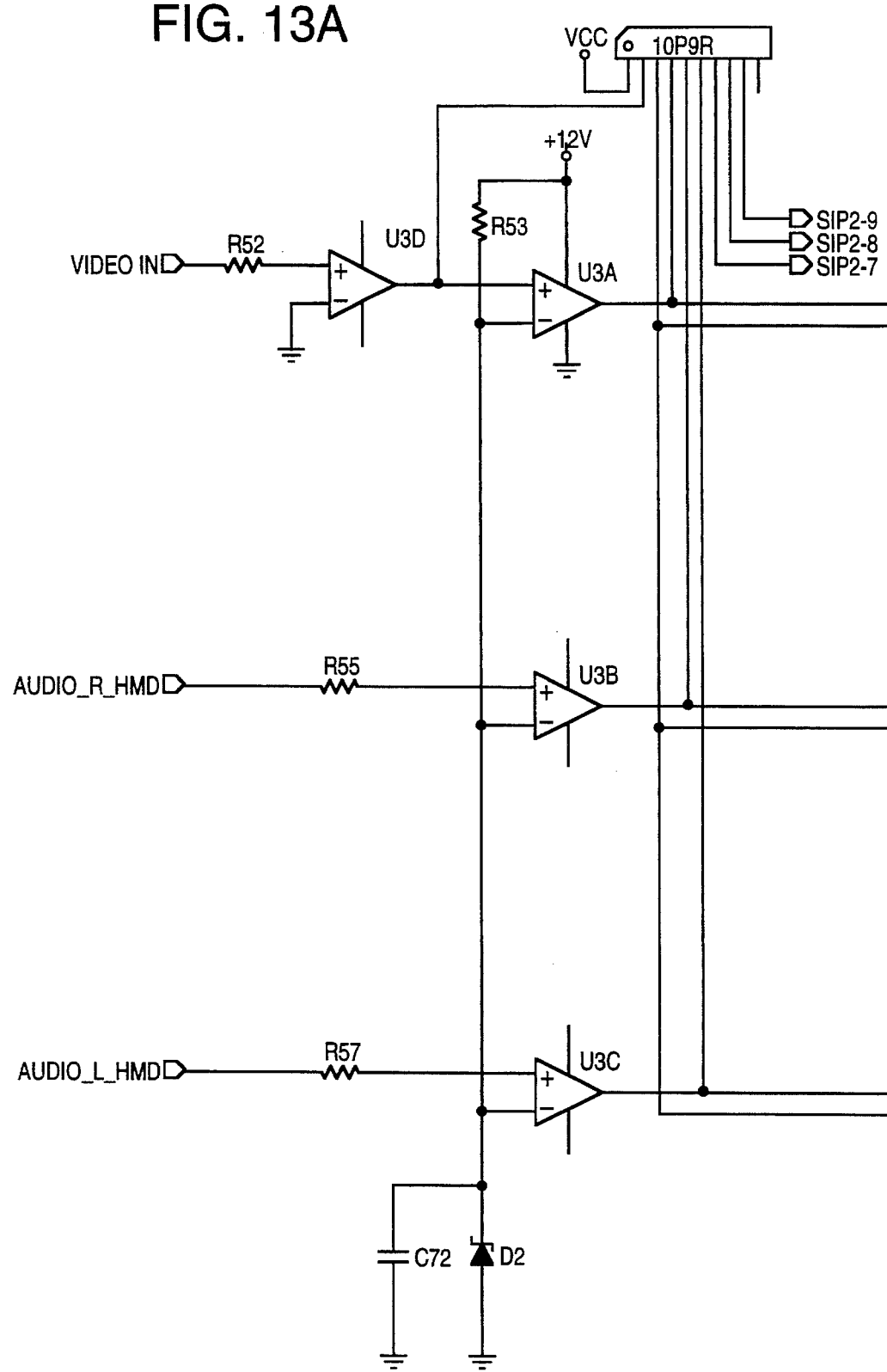
Figure 14:
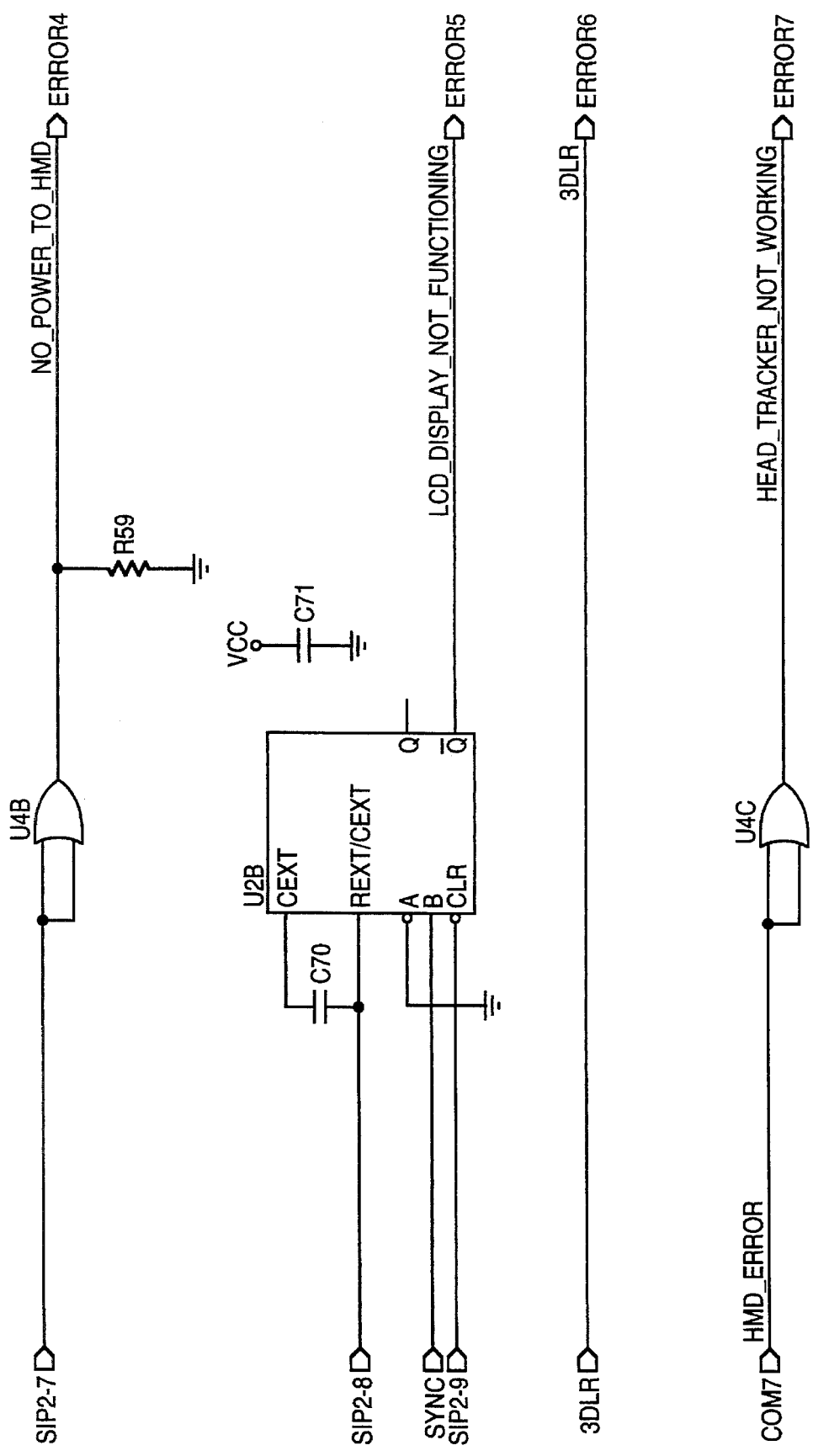

FIGS. 13 and 14 shows circuitry which generates signals on lines ERROR1 and ERROR3–ERROR7. (Signals on lines ERROR0 and ERROR2 indicate whether PCB 430 is receiving video and audio signals and are provided by interface box 120 through ports J9 and J1A.) Lines ERROR1 and ERROR3 carry signals that indicate whether PCB 430 is receiving video and audio signals on lines VIDEO_IN, AUDIO_R_HMD, and AUDIO_L_HMD. Line ERROR4 carries a signal indicating whether PCB 430 is receiving power. Line ERROR5 carries a signal indicating whether LCD displays 136 and 138 are functioning. Line ERROR6 carries the left-right signal from line 3DLR which is sent to interface box 120 then to the video game console. Line ERROR7 carries a signal indicating whether the head tracker is functioning.

Although the present invention has been described with reference to particular embodiments, the description is only an example of the invention's application and should not be taken as a limitation.

We claim:

1. A video display device comprising:
   a first video display viewable by a left eye of a viewer;
   a second video display viewable by a right eye of the viewer;
   a driver circuit having an input lead for accepting a video signal from a video signal source, a first video output bus coupled to the first video display, and a second video output bus coupled to the second video display, wherein, when the video display operates in a first mode, the driver circuit alternates between causing the first video display to display a field of the video signal and causing the second video display to display a field of the video signal; and
   a view control circuit which, when operating in the first mode, provides to the video signal source, a left-right signal which alternates between indicating a left view of a stereoscopic image is requested as a field of the video signal and indicating a right view of the stereoscopic image is requested as a field of the video signal.

2. The video display device of claim 1, further comprising headgear on which the first and second video display are mounted.

3. The video display device of claim 2, wherein the first and the second video displays are each a liquid crystal display.

4. The video display device of claim 3, further comprising an optical system for providing a view of the first video display to the left eye of the viewer and a view of the second video display to the right eye of the viewer.

5. The video display device of claim 2, further comprising a head tracker mounted on the headgear to sense orientation of video display device.

6. The video display device of claim 5, wherein the head tracker comprises a bubble level which determines an angle relative to the direction of gravity.

7. The video display device of claim 6, wherein the head tracker comprises a flux compass which determines an angle relative to the direction of the earth's magnetic field.

8. The video display device of claim 1, wherein, in the first mode, while the driver circuit is causing the first video display to display a field from the video signal, the left-right signal requests that the source of video signals provide a video signal which represents the left view, and while the driver circuit is causing the second video display to display a field, the left-right signal requests that the source of video signals provide a video signal which represents the right view.

9. The video display device of claim 8, wherein in the first mode, the view control circuit changes the left-right signal from requesting the left view to requesting the right view during a vertical blanking interval.

10. The video display device of claim 1, wherein the video signal accepted on the input lead of the driver circuit is in a format suitable for a monoscopic display.

11. The video display device of claim 10, wherein the video signal accepted on the input lead of the driver circuit is a signal selected from the group comprising NTSC, PAL, RGB, and HDTV signals.

12. The video display device of claim 1, wherein, when the video display device is operating in a second mode, the driver circuit drives both the first and second displays simultaneously.

13. The video display device of claim 1, wherein, when the video display device is operating in a second mode, the view control circuit provides to the video signal source a left-right signal that is constant.

14. An interface box, comprising an interface circuit controlling transmission of signals between a video signal source and a head mounted display, wherein the transmission of signals is controlled according to a protocol which includes transmission of a left-right signal from the head mounted display to the video signal source, the left-right signal alternating a request for a left view of a stereoscopic image with a request for a right view of the stereoscopic video image.

15. The interface box of claim 14, wherein the head mounted display comprises a first and a second video display, and the interface box further comprises:

a driver circuit having an input lead for accepting a video signal from the video signal source and a video output bus for connecting to the head mounted display, wherein the driver circuit provides signals on the video output bus which alternate between causing the first video display to display a field of the video signal and causing the second video display to display a field of the video signal; and a view control circuit which provides the left-right signal to the video signal source, wherein the left-right signal alternates between indicating a left view of a stereoscopic image is requested as a field of the video signal and indicating a right view of the stereoscopic image is requested as a field of the video signal.

16. A source of video signals comprising:

a first memory and a second memory holding respectively a digital representation of a left view and a right view of a stereoscopic image;

a video adapter converting a digital representation of an image into a field of a video signal, the video adapter having an output lead for providing the video signal to a video display; and means for selectably connecting the first memory or the second memory to the video adapter, the means for connecting having an input lead for accepting, from the video display, a left-right signal which determines which of the first and the second memories is connected to the video adapter.

17. A system for displaying both monoscopic and stereoscopic images comprising:

a source of a video signal, the source having an input lead for accepting a left-right signal and an output lead for carrying the video signal, the source being operable in a first mode wherein the video signal represents of a left view of a stereoscopic image and operable in a second mode wherein the video signal represents of a right view of the stereoscopic image; and a head mounted video display device including:
a headgear wearable by a viewer;
a first video display viewable by a left eye of the viewer and a second video display viewable by a right eye of the viewer, the first and second video displays being mounted on the headgear;

a driver circuit having an input lead coupled to the output lead of the video adapter, a first video output bus coupled to the first video display, and a second video output bus coupled to the second video display, wherein the driver circuit alternates between causing the first video display to display the video signal and causing the second video display to display the video signal; and a view control circuit having an output lead coupled to the input lead of the source and providing the left-right signal, wherein the left-right signal determines whether the source operates in the first or the second mode.

18. The system of claim 17, wherein the source for providing a video signal further comprises:

a first memory storing a digital representation of a left view of a stereoscopic image;

a second memory storing a digital representation of a right view of the stereoscopic image;

an adapter providing a video signal which represent an image represented in a memory; and means for selectably connecting the adapter to one of the first and the second memories, wherein when the source operates in the first mode the adapter is connected to the first memory and when the source operates in the second mode the adapter is connected to the second memory.

19. A method for selectably producing a monoscopic or a stereoscopic video image, comprising the steps of:

coupling a source of video signals to a video display; and sending a left-right signal from the video display to the source of video signals, wherein the left-right signal alternates between requesting that the source of video signals provide in a video signal to the video display a field representing a left view of a stereoscopic image and requesting that the source of video signals provide in the video signal a field representing a right view of the stereoscopic image.

20. The method of claim 19, further comprising the steps of:

sending from the source of video signals to the video display a video signal which represents the requested one of the left view and the right view of the stereoscopic image;

if the signal sent to the video source requested the left view, then displaying the video signal sent from the source of video signals on a display for viewing by the left eye of a viewer; and if the signal sent to the video source requested the right view, then displaying the video signal sent from the source of video signals on a display for viewing by the right eye of a viewer.

* * * * *